US006328149B1

(12) United States Patent
Blad et al.

(10) Patent No.: US 6,328,149 B1
(45) Date of Patent: Dec. 11, 2001

(54) MOBILE COIN COLLECTION SYSTEM

(76) Inventors: Steven J. Blad, 2316 Thayer, Henderson, NV (US) 89104; Kenneth R. Dickinson, 8344 Viceroy La., Las Vegas, NV (US) 89117

( * ) Notice: Subject to any disclaimer, the term of this patent is extended or adjusted under 35 U.S.C. 154(b) by 0 days.

(21) Appl. No.: 09/395,396

(22) Filed: Sep. 13, 1999

Related U.S. Application Data

(63) Continuation-in-part of application No. 09/259,207, filed on Mar. 1, 1999.

(51) Int. Cl.[7] .................................................... G01G 19/42

(52) U.S. Cl. ............................................ 194/217; 194/350

(58) Field of Search .................................... 194/202, 217, 194/350; 453/17; 232/15; 177/25.17

(56) References Cited

U.S. PATENT DOCUMENTS

| | | | | |
|---|---|---|---|---|
| 5,259,491 | * | 11/1993 | Ward, III | 194/350 |
| 5,469,951 | * | 11/1995 | Takemoto et al. | 194/206 |
| 5,531,309 | * | 7/1996 | Kloss et al. | 194/202 |
| 5,619,932 | * | 4/1997 | Efland et al. | 194/350 X |
| 5,620,079 | * | 4/1997 | Molbak | 194/217 |
| 5,732,878 | * | 3/1998 | Schroder et al. | 232/15 X |
| 5,875,879 | * | 3/1999 | Hawthorn | 194/350 |

* cited by examiner

*Primary Examiner*—F. J. Bartuska
(74) *Attorney, Agent, or Firm*—Siemens Patent Services, LC

(57) ABSTRACT

A mobile cart for inventorying monies collected from a coin operated machine. The mobile cart includes a receptacle for receiving and storing inventoried moneys, a data reception device, and a weight measuring device in electrical communication with the data reception device. The mobile cart also includes a receiving platform associated with the weight measuring device that is adapted to receive a coin box.

39 Claims, 16 Drawing Sheets

FIG. 8
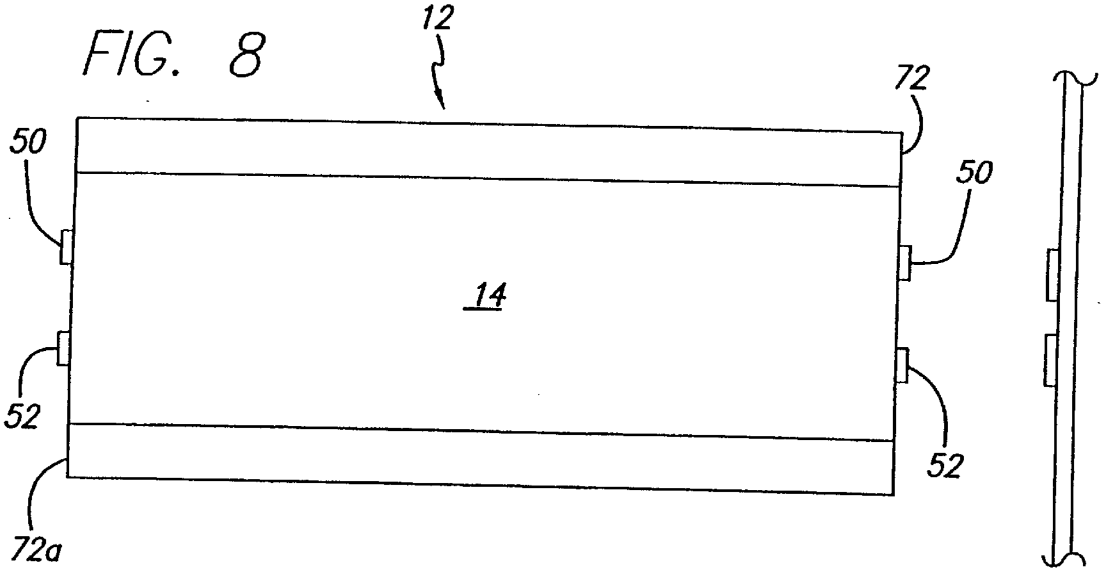
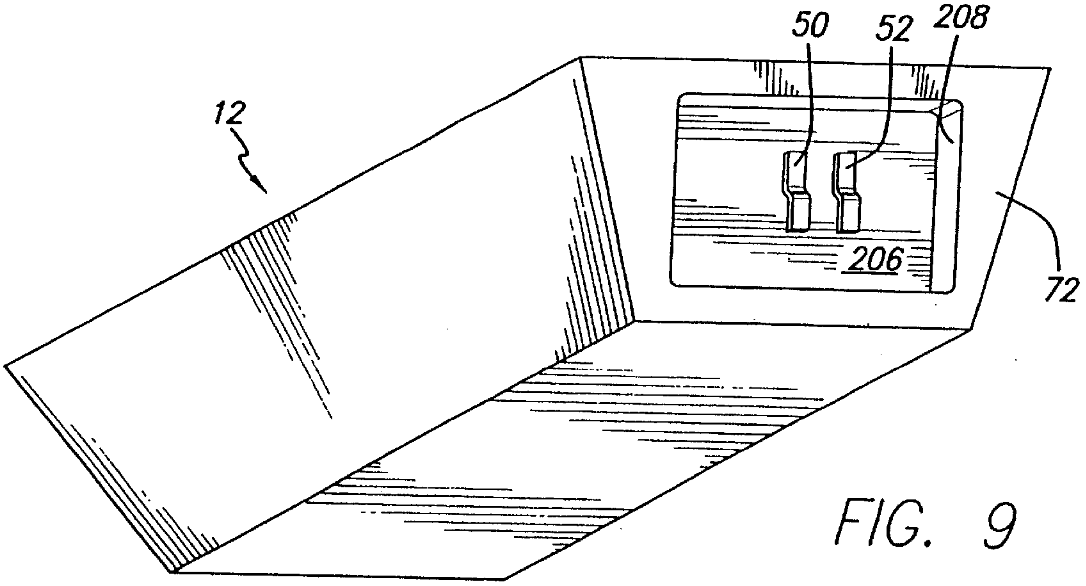
FIG. 9
FIG. 10
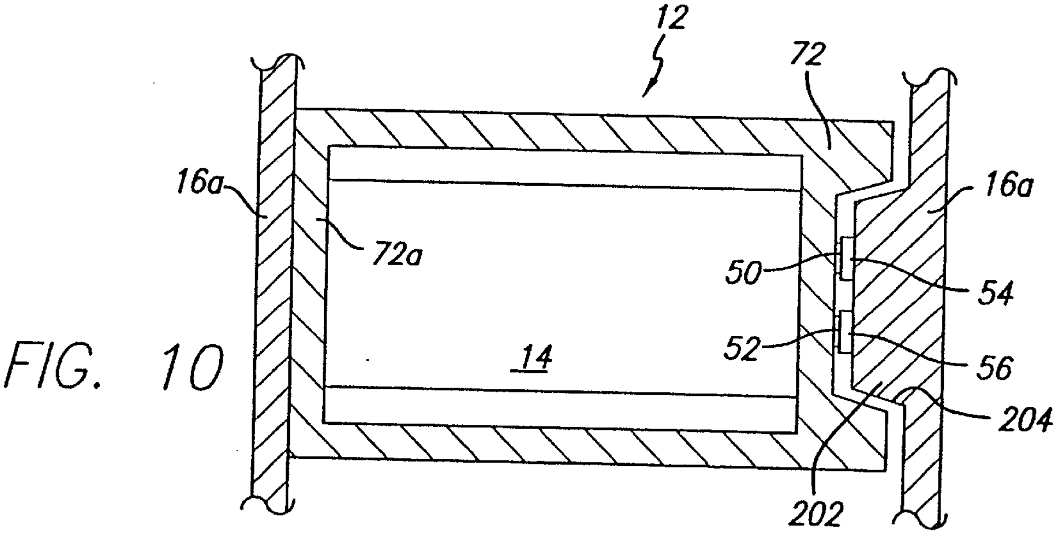

MOBILE COIN COLLECTION SYSTEM

REFERENCE TO RELATED APPLICATIONS

This application is a continuation-in-part of application Ser. No. 09/259,207, filed Mar. 1, 1999 pending.

BACKGROUND OF THE INVENTION

1. Field of the Invention

The present invention relates to a device for determining the amount and value of the contents of a coin box of a coin operated machine.

2. Description of the Prior Art

Certain activities, such as vending and gaming, are available to the public in commercial premises dedicated to these activities. These premises contain gaming machines which operate automatically when a patron inserts coins or tokens into the machine. Gaming machines tend to amass coins or tokens rapidly, and must periodically be emptied. Since machine operation is equally feasible with coins and tokens, discussion from this point forward will refer to coins, it being understood that tokens may be substituted to similar effect.

In particular, gaming machines are available in large numbers in casinos. Large numbers of people enjoy using these machines, which may all be in use despite the number of machines available. To enable rapid reestablishment of operability after retrieval of coins, gaming machines are provided with interchangeable, removable coin collection boxes. Service personnel employed by the casino come to a gaming machine with an empty coin collection box, remove the full box, and insert the new box. The full box is then brought to a counting facility for accounting and verification of its contents.

Many boxes may be present simultaneously at the counting facility. Various schemes have been employed to enable the casino to know which box is associated with which gaming machine. These schemes use printed numbers on small pieces of paper, or serial numbers printed on the side of coin boxes. Both methods are prone to human error and mistake.

The casino may easily fail to recover all coins which theoretically are present in the coin box. Such loss may stem from either of two possibilities. One is that the bin was misaligned within its host gaming machine, so that some coins could fail to enter the box. In this case, the coins could lodge within recesses in the machine, or be retrieved and pocketed during removal of the box by dishonest personnel servicing the machine. These personnel may also remove coins from the interior of the box, even when the coins have properly entered the box.

Although casinos have automated systems utilizing the master computer for calculating a total sum which theoretically has been amassed by the machines, the system falls short of being able to pinpoint specific causes of loss. This is because large numbers of coin or token bins are received at the counting facilities, and it is not possible to identify which box was short of its calculated receipts. It is merely possible to calculate that the sum of the coins actually collected falls short of theoretical receipts. Thus the operator of the premises cannot identify poorly installed bins and dishonest employees.

A coin receiving machine having a removable coin collection box and electronic memory devices contained within both machine and box is shown in U.S. Pat. No. 5,056,643, issued to Bernd Kirberg on Oct. 15, 1991. Kirberg's device is a vending machine rather than a gaming machine, and lacks the arrangement of guiding structure assuring appropriate and reversible mating of the coin collection box within the host machine and electrical contacts found in the present invention.

Mechanical disconnection of an electronic memory device within a coin receiving machine upon removal of a coin collecting receptacle is shown in U.S. Pat. No. 5,485,285, issued to Jerome Remien on Oct. 17, 1995. Remien's machine is not a gaming machine, and lacks the arrangement of guiding structure assuring appropriate and reversible mating of the coin collection box within the host machine and electrical contacts found in the present invention.

Keyed insertion of a coin collecting receptacle into a host machine is exemplified in U.S. Pat. No. 2,371,114, issued to Walter Von Stoeser on Mar. 6, 1945. Stoeser's arrangement does not allow for reversible insertion of the receptacle, as provided in the present invention. Also, Stoeser's machine is not a gaming machine, and lacks electronic memory and electrical contacts enabling communication to electronic memory, as found in the present invention.

None of the above, taken either singly or in combination, is seen to describe the instant invention as claimed.

SUMMARY OF THE PREFERRED EMBODIMENTS

The present invention provides structural cooperation between a coin collecting box and its host machine so that the box is reversibly insertable into the host machine and so that accurate positioning of the box within the host machine is assured. In a preferred embodiment, the coin box and the cavity of the host machine are each provided with complementary grooves or projections assuring appropriate alignment of the box.

A preferred configuration of guiding members includes a low upwardly oriented projection disposed upon the flat floor of the cavity of the host machine. The coin box has a flat floor including short depending walls which partially surround and closely cooperate with the projection when the coin box is fully inserted and lowered into position. Both the projection of the host machine and the walls of the coin box are inclined, so that lowering the coin box also centers the coin box over the projection. The coin box is configured to avoid cracks and crevices into which coins may lodge, be concealed, or otherwise be lost.

The host machine and the coin box are each provided with electronic memory devices for storing information relating to the identity of each and with circuitry enabling communication between the two memory devices. Each memory device receives information relating at a minimum to the identity of its partner memory device. Therefore, when the coin box is returned to the counting facility, the operators of the casino may ascertain which coin box has been associated with which gaming machine. Other memory devices may receive information relating to coin count as well. Therefore, any shortage of coins will be attributable to the correct source of the loss, and remedial steps may then be taken. At the same time, counting and verification of other machines and coin boxes may proceed independently of a short count relating to any one particular coin box.

To enable communication between box and host machine, electrical contacts are provided in each such that they will be operable regardless of direction of insertion of the coin box into the host machine. The communication circuits completed by mating of these contacts are separable, or broken when the coin box is removed. Contact is preferably sliding in nature rather than depending upon interfering abutment. Effective contact may then ensue without requiring the extreme precision required for abutting contact.

The arrangement of the contacts reduces requirements for precision when mating. Unlike connection devices such as multipin connectors, which must be carefully aligned prior to mutual engagement, the electrical contacts act automatically, requiring no attention from the installing personnel whatsoever. Physical alignment of the coin box within the cavity of the host machine is the only requirement. Cooperation between the depending walls of the coin box and the projection of the host machine assures that it is nearly impossible to misalign the two.

The electrical contacts are disposed upon the flat upper surface of the projection of the host machine and upon the flat floor of the coin box. In an alternative to actual contact, communicable engagement may be accomplished by induction. Coils embedded within the box and the host machine on the flat surfaces will cause signals to be transferred inductively without resorting to actual contact.

According to another aspect of the invention, a mobile inventorying and collection apparatus provides for immediate inventorying of moneys collected in the coin box at an area adjacent to the host machine, and transfer of the inventoried monies to a secured receptacle on-board the mobile apparatus, preferably for later transfer to a secured coin repository. Host machines may be gaming machines, vending machines, change machines or other machines in which monies are collected, without limitation. The mobile apparatus may be a transportable cart or other conveyance for supporting the system components described below in greater detail.

The system preferably includes the coin box which is interchangeably received by both the host machine for initial collection and the mobile cart for measurement, including weighing collected moneys on a scale provided on the mobile apparatus. Information identifying the coin box and inventory information specific to the coins and tokens received and collected from the host machine is transmitted to either a CPU provided on-board the mobile cart for later downloading to a remote data management system, or directly to the remote data management system. Such data transmission may be concurrent with collection processing, or batch downloaded after collection of moneys from a plurality of host machines. After the coin box has been inventoried, its contents are then transferred to a secure receptacle provided on-board the mobile cart, and the coin box is returned to its designated host machine for subsequent coin collection, thereby immediately placing the host machine, such as a gaming machine, back in service using the original coin box.

The coins/tokens may be segregated by numerical denomination in the mobile inventorying system, for separate secured retention in corresponding receptacles provided in the mobile cart. Paper money or scrip may be collected and accounted for by the apparatus of the invention. The mobile cart is then preferably advanced to a subsequent host machine as necessary to inventory all host machines in a particular location and efficiently and securely collect monies in the manner previously described. The mobile cart may be retrofittable to existing cart systems, configured to hand or vehicle transfer systems, or self-propelled in an automatic delivery system to deliver inventoried moneys to a remote count room or other receiving facility. According to another embodiment of the invention, the mobile apparatus includes a self-propelled tow vehicle provided with inventorying and collection apparatus and one or more coin collection carts, each having one or more secure receptacles, to be towed by the tow vehicle adjacent to the host machines to be inventoried.

According to another aspect of the present invention there is provided a device for extracting information from an electronically-identified coin box of a coin operated machine. The device includes a memory device for extracting and storing data, a calibrated scale in electrical communication with the memory device, and circuitry for electrically connecting the memory device to the coin box.

According to yet another aspect of the present invention there is provided a method of inventorying moneys collected from a machine. The method includes the steps of providing a weighing device, electrically connecting a coin box to the weighing device, and calculating the number of coins in the coin box.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 8 is an exploded top plan view of the coin collection box of FIG. 7 and the inside wall of a gaming machine having contacts thereon.

FIG. 9 is a perspective view of a coin collection box having guiding structure including contacts in the side thereof.

FIG. 10 is a cross-sectional top plan view of the coin collection box of FIG. 9 inserted into a gaming machine.

DETAILED DESCRIPTION OF THE PREFERRED EMBODIMENTS

Figure 1:
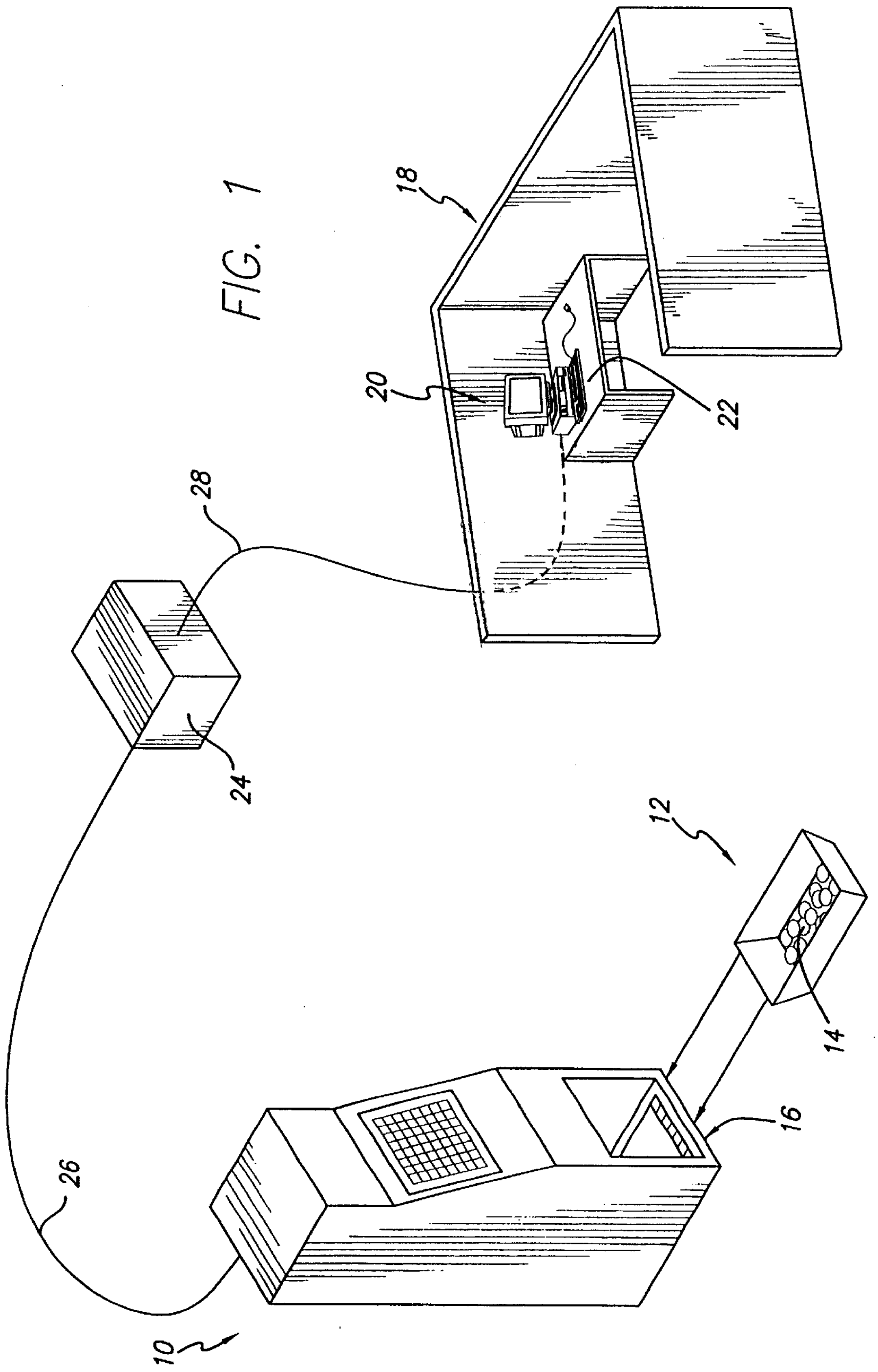
FIG. 1 is a perspective, environmental, diagrammatic view of the coin collection system of the invention, showing slot machine coin collection application in a casino.

FIG. 1 shows the present invention as it would be employed in a casino (not shown in its entirety). The invention comprises a coin operated machine 10 having a removably insertable coin collection box 12 for receiving and storing coins 14 inserted into machine 10. It will be understood that the coin collection box 12 may be used to collect paper money and scripp according to the invention, for use with machines 10 that require paper money or scripp for operation. Coin box 12 is periodically removed for counting and retrieving coins 14. A similar coin box (not shown) is inserted into a cavity 16 serving as a receptacle for containing coin box 12 when machine 10 is in use. Coin box 12 is designed to be reversibly inserted into cavity 16 in the interests of efficiently replacing coin boxes and expeditiously returning machine 10 to active service.

In a typical casino, coin box 12 is carried on a cart (not shown) together with other coin boxes (not shown) to a counting facility 18 for retrieval of coins and reconciling of accounts. Counting facility 18 has a computer monitor 20 and a keyboard 22. Machine 10 has a memory device (see FIG. 2) which is employed in tracking receipts and disbursements made by machine 10. This information is communicated to a central computer 24, which includes another memory device, by any suitable method, such as by cable 26. Monitor 20 and keyboard 22 communicate with computer 24 by cable 28. Information contained in the two memories further includes data identifying which coin box has served machine 10 during a specified time period. The operator of the casino may thus account for shortages in the count of retrieved coins, and may pinpoint the source of any loss as accruing from pilferage or from mechanical failure. Identities of the personnel removing and returning coin box 12 may also be tracked in the memories.

Figure 2:
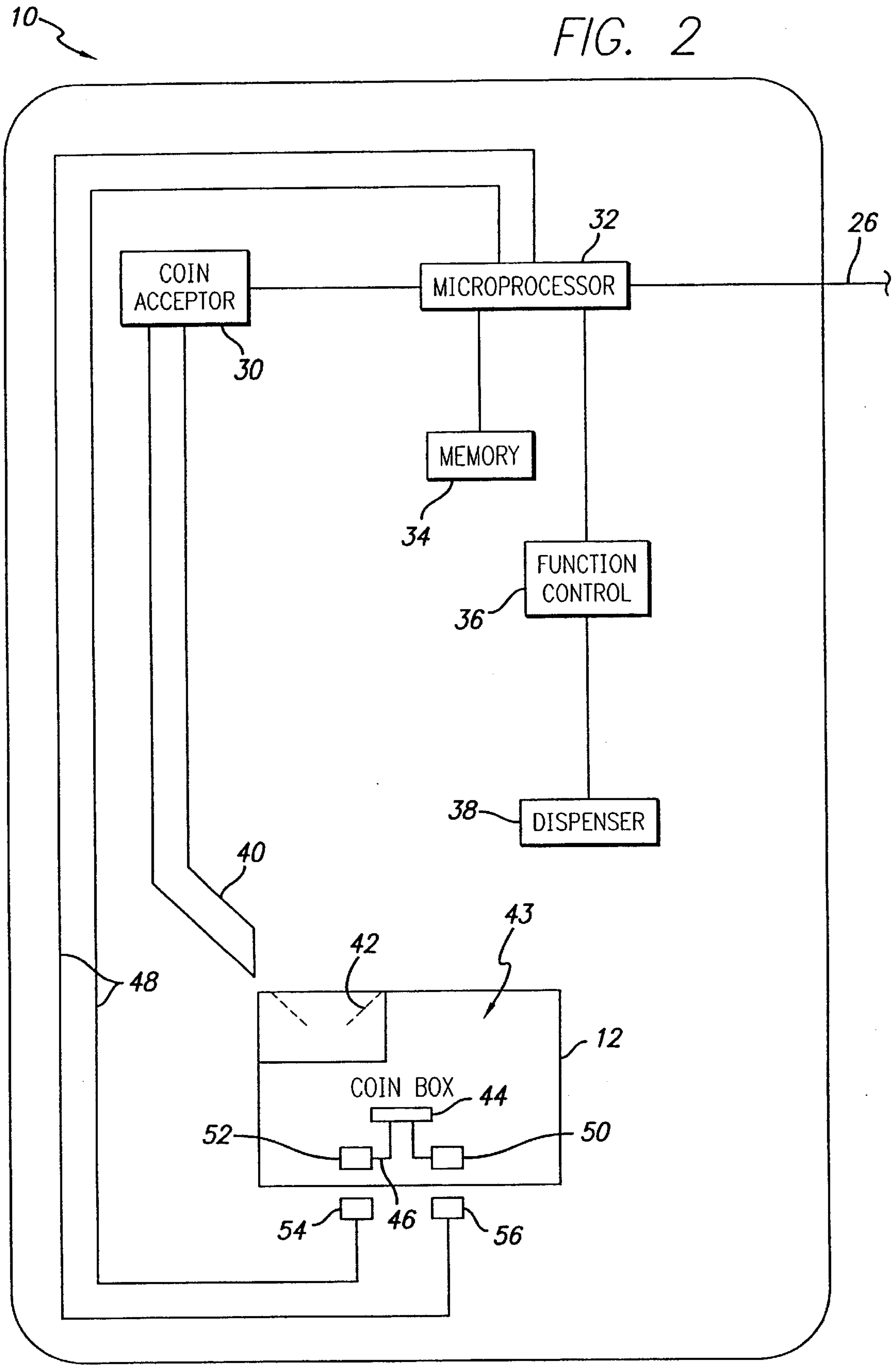
FIG. 2 is a front elevational, diagrammatic view of the invention.

FIG. 2 shows typical components of machine 10. A coin accepting apparatus 30 receives coins, verifies authenticity and value of coins, and sends a signal to a microprocessor 32 enabling activities to proceed if sufficient value has been received. Microprocessor 32 has an associated memory device, such as RAM 34. A function controller 36 is enabled by a signal from microprocessor 32 to accept commands from the patron of machine 10 responsive to acceptance of a coin by coin accepting apparatus 30 and determination of sufficient value for the requested function.

In gaming machines, the function will relate to gaming or gambling. In this case, the function will be performing a calculation of a random chance result, and dispensing a return based upon the chance result. The return, made by a dispenser 38, may be a payoff if the chance result favors the patron, and will result in retention of inserted money by machine 10 if the chance result does not favor the patron.

The present invention is equally applicable to machines performing functions other than gaming. For example, the machine may be a vending machine (not shown). If this were the case, then dispenser 38 would comprise well known apparatus for selecting and dispensing merchandise, and optionally for making change.

Coin box 12 is diagrammatically shown in a predetermined, operative position within machine 10. This signifies that coin box 12 is correctly positioned to successfully receive coins delivered thereinto by machine 10, thereby defeating a potential source of loss, i.e., spillage past the coin box 12. If the function being performed results in a determination that an inserted coin should be retained by machine 10, then that coin is routed to coin box 12. This is indicated diagrammatically by chute 40. Alignment of chute 40 with coin guide 42, which leads to a coin storage receptacle 43, represents the operative position of coin box 12 within machine 10.

Of course, machine 10 may retain coins for potential return to the patron. Apparatus for accomplishing this is well known and may be incorporated for the successful operation of machine 10 if desired.

The operative position further signifies that coin box 12 is properly aligned to assure completion or connection of communications circuitry. It being recalled that coin box 12 has a memory device 44, circuitry 46 is provided to transmit signals to memory device 44. Circuitry 46 is connected to complementary circuitry 48, which complementary circuitry 48 is in turn connected to memory device 34. Final connections are made by electrodes 50, 52 of circuitry 46 and electrodes 54, 56 of circuitry 48. Cable 26 may be regarded as a further component of circuitry 48, and performs the function of transmitting communication signals between microprocessor 32 and its associated memory device 34 and external computer 24 and its associated memory device (not shown apart from computer 24).

An operator may utilize keyboard 22 to query microprocessor 32 of machine 10, in order to receive information from machine 10 prior to receiving coin box 12. The same information available from microprocessor 32 may be entered into memory device 44 of coin box 12. Alternatively, some information may be restricted from memory device 34 or from memory device 44, so that there may be a difference in entered data between these components. Many algorithms or programs may be utilized in controlling and communicating between computer 24 and memory devices 34 and 44, depending upon the exact functions to be performed. These algorithms are well known or may be created especially for the application by those of skill in the art.

Information gathered by the memory device 34 can include host machine 10 identification, time and date information, and data transferred from a coin meter 125 (FIG. 3) in the host machine. It will be understood that the data other than coin meter data can be monitored by meters within the host machine 10, which are preferably associated with the memory device 34. The electronic monitoring system of the host machine 10 (which is associated with memory device 34) can monitor any electrical signal generated by the host machine 10. For example, door open signals, signals generated by the coin acceptor mechanism and signals generated by the bill acceptor mechanism can be monitored. These signals can be counted or analyzed to generate additional information that can be stored in the data chip in the base of the coin collection box 12 for later transfer to the central computer 24. Door open signals can be generated by, for example, an electric switch whose contacts are opened and closed when the door is pressed against the switch. The electronic monitoring system monitors the voltage going through the switch to determine the state of the door (opened or closed). Any mechanical movement within the machine can be monitored by the electronic monitoring system by attaching an electronic position sensor to the mechanical device to be monitored.

In a preferred embodiment, the host machine 10 includes electrical outputs that correspond to certain events that are monitored by the electronic monitoring system. The outputs may be lights, bells, buzzers, whistles, relays or the like. For example, if the host machine 10 includes a switch for monitoring the status of the door (opened or closed) a corresponding light may be included in the host machine 10. Therefore, when the door is ajar, the light is lit, thereby alerting the operator that the door is ajar. Other signals/outputs, such as bucket in position (on or off contacts), illegal bucket in position, bucket full, data tampering detected, and the like, are within the scope of the present invention.

Figure 3:
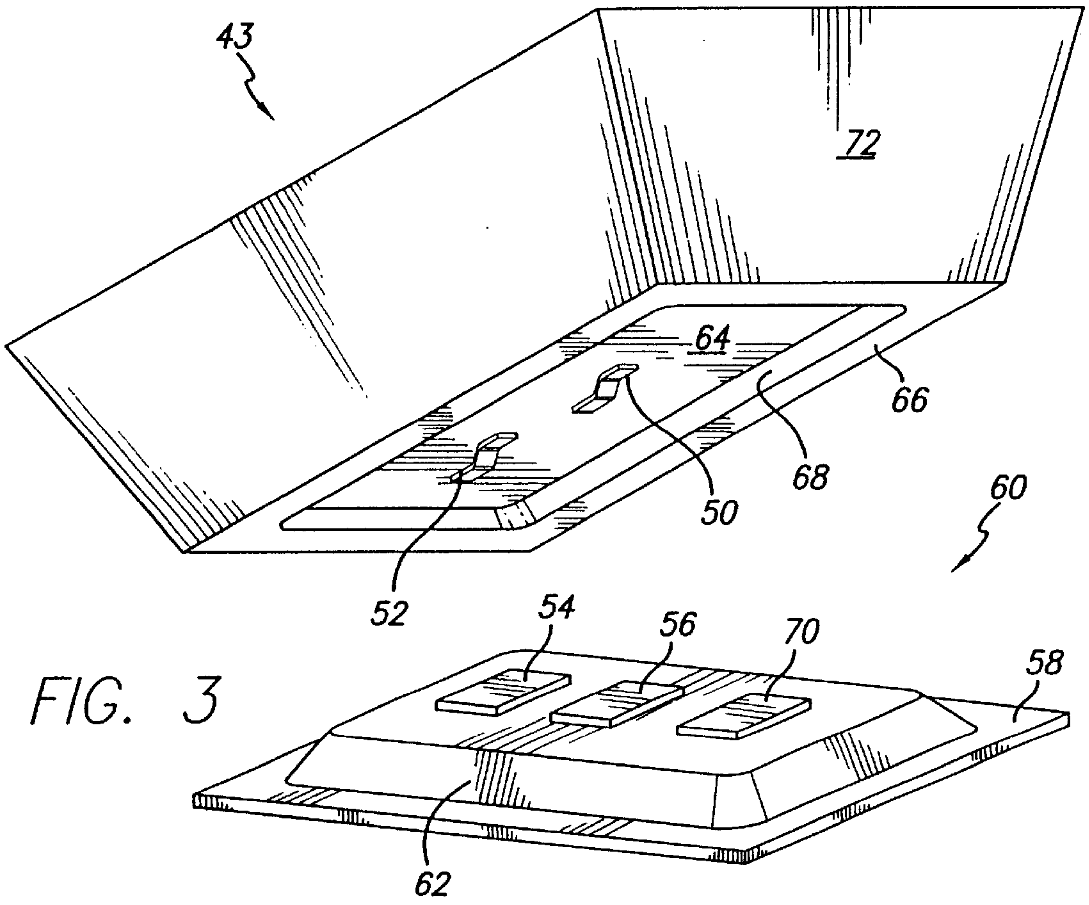
FIG. 3 is an exploded perspective detail view of components seen at the bottom of FIG. 2.
Figure 4:
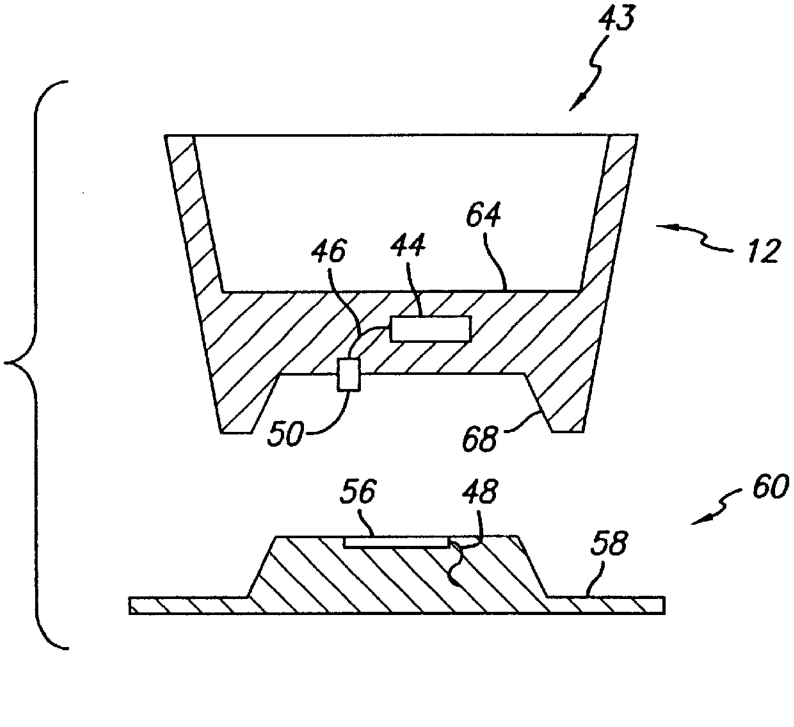
FIG. 4 is a front cross sectional view of the components of FIG. 3.

Interfitting cooperation between coin box 12 and cavity 16 (see FIG. 1) is shown in FIGS. 3 and 4. Cavity 16 has receiving structure for removably receiving and locating coin box 12, comprising a floor 58 and a projection 60 projecting upwardly from floor 58. Projection 60 has an inclined lateral wall 62 which gives projection 60 a tapered configuration wherein the top is smaller than the bottom. Coin box 12 has guiding structure including a bottom panel 64 and a wall 66 depending from bottom panel 64. Wall 66 has an inclined surface 68 complementing and closely cooperating with tapered projection 60.

When coin box 12 is inserted into cavity 16 and released, coin box 12 will be urged by gravity to attain the predetermined position, shown representatively in FIG. 2, beneath chute 40 (see FIG. 2) or equivalent structure for depositing coins into receptacle 43.

In the present example, corresponding inclination of wall 62 and surface 68 urges coin box 12 to become centered over projection 60. Of course, inclination of wall 62 and surface 68 could be reversed to the same effect. In other embodiments, it would be possible that corresponding receiving structure of a coin operated machine and guiding structure of the coin box be differently configured. For example, the coin box could be urged to the left, right, or to the rear, or to an intermediate position having combined characteristics of these directions.

Electrodes 50, 52 and 54, 56 and their respective alignment are also shown in FIG. 3. Electrodes 50 and 52 are exposed from below panel 64, and will make physical contact with electrodes 54, 56, which are exposed from above projection 60 when coin box 12 is lowered into the predetermined position.

Preferably, contact is sliding contact, rather than requiring penetration and consequent careful alignment of the respective male and female electrodes (not shown). In addition to sliding contact, electrodes 50, 52 and 54, 56 are arranged serially with respect to the direction of insertion of said coin box into said coin operated machine, so that coin box 12 need be moved in a straight line, and not necessarily moved in a complex manner to assure mating of the contacts 50, 52, 54, 56. The relative large size of one of the two sets of electrodes 50, 52 or 54, 56 assures contact even if coin box 12 is slightly misaligned relative to projection 60.

An additional electrode 70 is disposed upon projection 60 and connected in common with electrode 54. This arrangement assures that coin box 12, which is of symmetrical construction, may be inserted into cavity 16 with end wall 72 facing either to the rear of machine 10 or to the front thereof. Thus, machine 10 and coin box 12 are arranged to accept reversible insertion of the latter into the former. Simultaneously, electrodes 50, 52, and their corresponding electrodes 54, 56 of projection 60 are linearly alignable regardless of directional orientation of coin box 12 within machine 10, and will come into operative proximity when coin box 12 attains its predetermined position within operated machine 10.

Figure 3A:
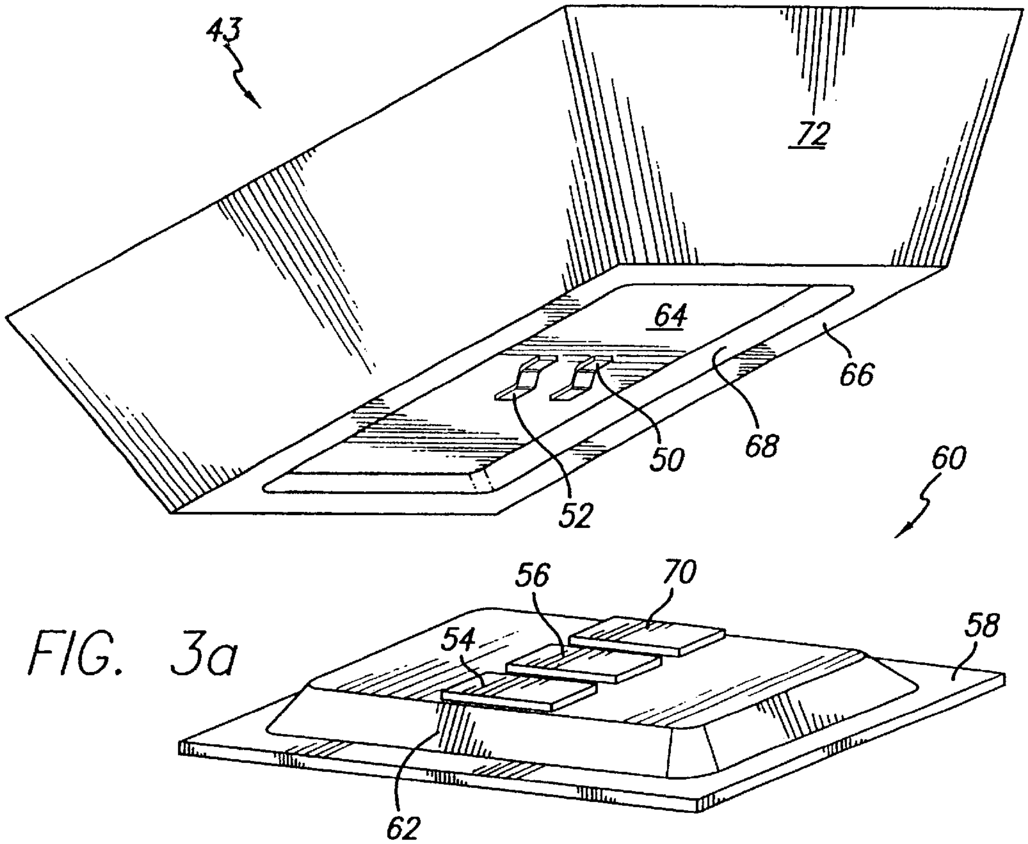
FIG. 3*a* is an exploded perspective detail view of components seen at the bottom of FIG. 2. having an alternative electrodes arrangement.

In another embodiment, as shown in FIG. 3*a*, electrodes 50, 52 can be arranged in a side by side arrangement, such that they are normal to the direction of insertion the coin box 12. In this embodiment, electrode 50 is placed in the center of the coin box 12, relative to end walls 72, 72*a* and electrode 52 is offset therefrom. Electrodes 54, 56, 70 are affixed to projection 60 such that electrode 56 is in the center thereof, and the electrodes 54 and 56 are on either side of electrode 56. Therefore, the coin box 12 can be reversibly inserted into cavity 16 without regard to the orientation of coin box 12. It will be understood that a non-symmetrical coin box 12 is within the scope of the present invention. In such a case electrode 70 can be omitted and directional orientation of coin box 12 is not reversible.

FIG. 4 shows a preferred configuration of coin box 12 wherein upwardly projecting lateral walls of receptacle 43 are inclined such that the top of receptacle 43 is wider than the bottom thereof, and all internal surfaces are continuous and lack cracks and crevices which could otherwise trap or conceal coins. This view also shows the close cooperation between projection 60 and surface 68, and the arrangement of memory device 44 and contact 50 within panel 64.

Figure 5:
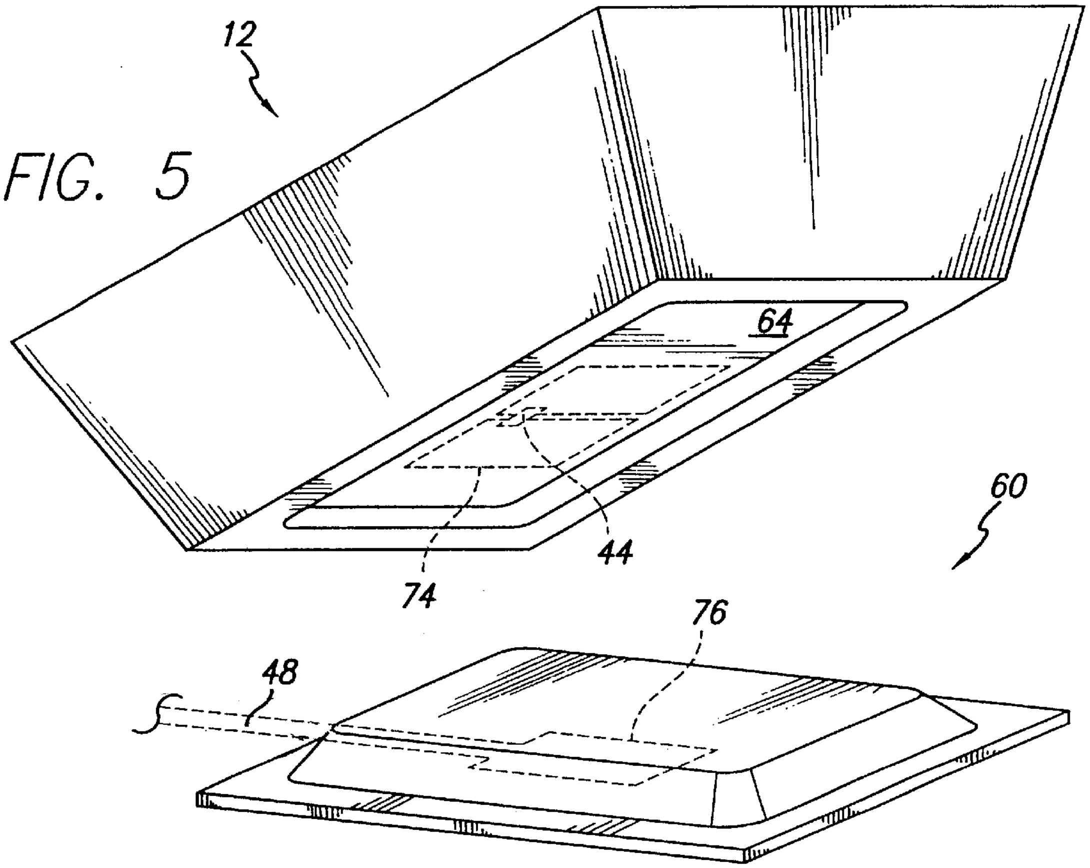
FIG. 5 is a view similar to that of FIG. 3, but illustrating a first alternative embodiment.

The arrangement of contacting electrode 50, 52, 54, 56 may be replaced by electrodes featuring non-contacting communication. As shown in FIG. 5, coin box 12 may be provided with an induction coil 74 embedded within panel 64 and connected to memory device 44. Machine 10 has a corresponding induction coil 76 embedded within projection 60, which coil 76 communicates with memory device 34 (see FIG. 2) through circuitry 48. Even though physical contact is absent, operative proximity enables coils 74 and 76 to transmit signals to one another.

Obviously, one of coils 74 or 76 may be replaced by a metal structure the form of which is not critical, in order to react appropriately with the electromagnetic field, depending upon the desired direction of communication. Where a coil 74 or 76 is provided, it will be understood to include a suitable power supply (not shown). The use of inductive coils for communicating signals is conventional, and these coils are shown only in representative capacity in FIG. 5.

Figure 6:
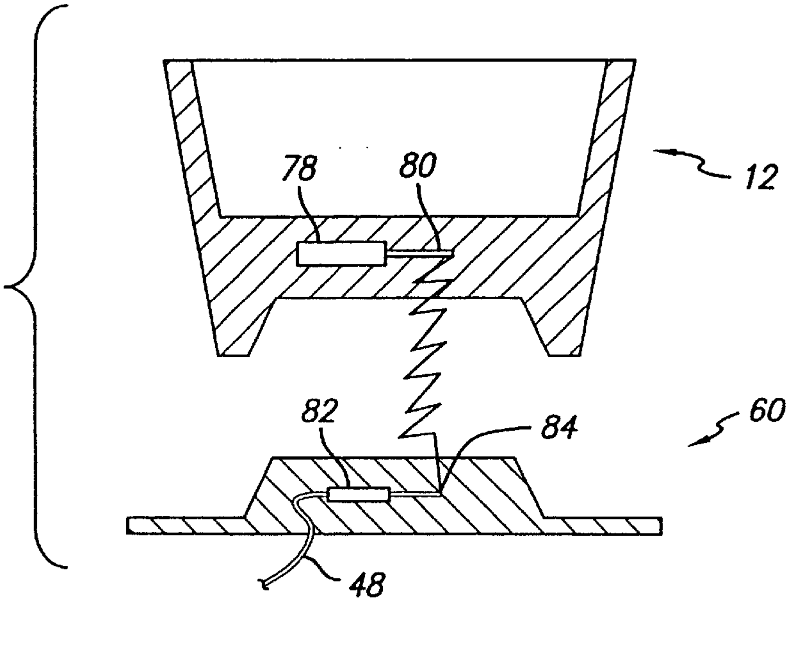
FIG. 6 is a view similar to that of FIG. 4, but illustrating a second alternative embodiment.

Another form of electrodes providing non-contact communication is shown in FIG. 6. Coin box 12 has a radio frequency transmitter and receiver 78 and an associated antenna 80. Of course, transmitter and receiver 78 is connected to memory device 44, although not shown in FIG. 6. Machine 10 has a corresponding radio frequency transmitter and receiver 82 having a respective associated antenna 84. The respective devices indicated as 78 and 82 may, of course, comprise only a transmitter or only a receiver, depending upon the desired scheme of communication. In the embodiments of FIGS. 5 and 6, signal strength will be predetermined so that communication is established only when a predetermined proximity between the communicating elements is attained.

Figure 7:
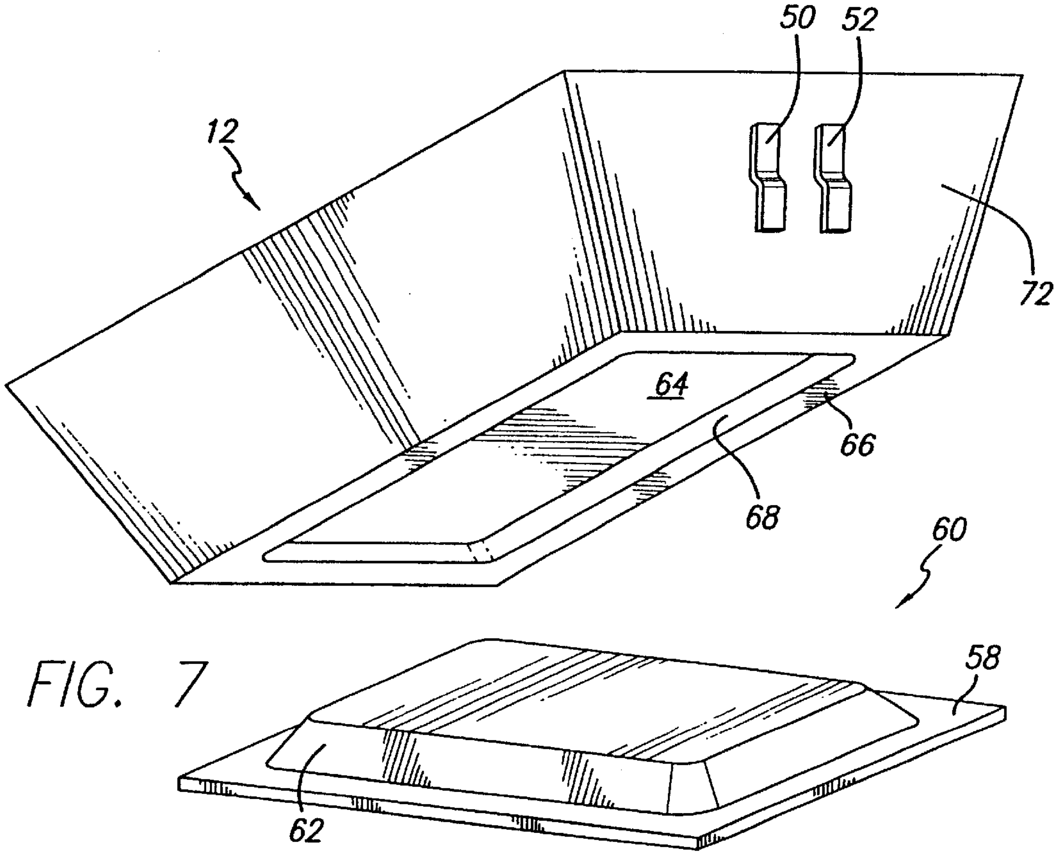
FIG. 7 is an exploded perspective detail view of a coin collection box having contacts on the side thereof and a corresponding projection.

FIGS. 7–8 show an embodiment of a coin collection box 12 that includes contacting electrodes 50, 52 on end wall 72. Contacting electrodes 50, 52 are shown in FIGS. 7–8 in a horizontal orientation, however it will be understood that contacts 50, 52 can be arranged in any orientation, such as vertical or diagonal. One of the inside walls 16*a* that defines cavity 16 (see FIG. 1) includes electrodes 54, 56. When coin collection box 12 is inserted into cavity 16, and the guiding structure (via gravity) locates the box 12 in its predetermined position, the contacting electrodes 50 and 52 will make physical contact with electrodes 54, 56.

Preferably, electrodes 54, 56 are located on the wall 16*a* opposite the opening into which the coin collection box 12 is inserted into cavity 16. It will be understood that contacting electrodes 50 and 52 can be located on end wall 72 and opposite end wall 72*a* (as shown in FIG. 8) so that the box 12 can be inserted into cavity 16 with end wall 72 facing either to the rear of machine 10 or to the front thereof. Thus, machine 10 and coin box 12 are arranged to accept reversible insertion of the latter into the former. It will be understood that contacting electrodes may be located on any of the end or side walls of coin collection box 12.

FIGS. 9–10 show another embodiment of a coin collection box 12 that includes contacting electrodes 50, 52 on end wall 72. In this embodiment, cavity 16 has receiving structure for removably receiving and locating coin box 12. However, the guiding structure is omitted from the bottom of coin collection box 12 and is included on end wall 72. The receiving structure includes a wall 16*a* and a projection 202 projecting outwardly from wall 16*a*. Projection 202 has an inclined lateral wall 204 which gives projection 202 a tapered configuration. Coin box 12 has guiding structure including a side panel 206 and end wall 72 depending from side panel 206. End wall 72 has an inclined surface 208 complementing and closely cooperating with tapered projection 202.

When coin box 12 is inserted into cavity 16, coin box 12 will attain the predetermined position beneath chute 40 (see FIG. 2) or equivalent structure for depositing coins into receptacle 43 as a result of the guiding structure. In a preferred embodiment, contact electrodes 50, 52 are held in contact relationship with electrodes 54, 56 by door 16*b*. As shown in FIG. 10, when door 16*b* is closed it contacts end wall 72*a*, thereby urging contact electrodes 50, 52 into contact relationship with electrodes 54, 56.

Of course, inclination of wall 204 and surface 208 could be reversed to the same effect. Further, the entire guiding structure could be included on another side or end wall of the coin box 12.

Variations and modifications to the invention may be introduced by those of skill in the art. For example, coin box 12 may be modified so that the front and rear sections of wall 66 enable sliding of coin box 12 on projection 60. Other structure (not shown) may be provided for supporting coin box 12 as it is slid into and out of its operative position within machine 10. Although electronic data handling has been described, optical and other systems may be substituted in whole or in part to similar effect. A handle may be located on the front of the coin box 12 to aid a technician in removing and inserting the coin box 12. End wall 72*a* may include a press surface, such as an elastomeric material, for door 16*b* to contact to aid in urging coin box 12 toward wall 16*a*.

As a further improvement, and with reference now to FIGS. 11–24, a mobile inventorying system 100 includes a mobile cart 102 provided with inventorying apparatus 104 for immediate inventorying of moneys such as coins or tokens collected in the coin box 12 (FIG. 1) at an area adjacent to the host machine 10, thereby eliminating the requirement to return the coin box 12 to a remotely-located counting facility to inventory coins/tokens received by the host machine 10. This system is also applicable to the efficient and accurate collection of paper money or scrip, utilizing the apparatus of the present invention to read and transfer the counts of paper money or scrip to the computer system. The system of the present invention is applicable to gaming machines, vending machines, change machines or other machines in which monies are collected, without limitation.

Inventorying apparatus 104 can include, without limitation, an on-board data collection unit CPU 106, an on-board calibrated scale 108, and at least one secure coin/token receiving container 110. The system preferably includes the coin box 12 for receiving and inventorying coins and tokens received from the host machine 10, and transmitting this data as well as identification data of the coin box 12 to either the on-board CPU 106 provided on-board the mobile cart 102 for later downloading to a remote data management system 120 (and/or central computer 24), or directly to the remote data collection system 120. The coins/tokens may be segregated by denomination in the mobile inventorying system 100. It will be understood that the identification data of coin box 12 can include, without limitation, any combination of host machine identification, coin count information and/or time/date information.

Processing then continues to additional host machines 10 as necessary to inventory all host machines in a particular location of, for example, a casino, and efficiently and immediately update gaming or other money receipts for those coins/tokens received in coin box 12 provided therein in the manner previously described. After each coin box 12 has been inventoried and its contents transferred to the secure coin/token receiving container 110, the coin box 12 is reinstalled in the designated cavity 16 provided in its designated host machine 10. The system components may be installed on a mobile cart 102, or alternatively may be provided on a support structure retrofittably affixable to existing portable wheeled cart systems for operation along tracked or untracked pathways, configured for manual or machine-propelled transfer systems by tow handle 111, or self-propelled under automatic robotic delivery system control to deliver inventoried moneys to a remote count room or other receiving facility.

Specifically, the inventorying apparatus 104 includes a receiving system in which the coin box 12 is removably received on a data collection system or receiving platform 114 provided with electrically or inductively coupled contacts and circuitry configured for achieving a desired electrical connection of electrodes 50, 52, 70 of the coin box 12 in the manner previously described. Preferably, the data collection system or receiving platform 114 includes an electronically readable, non-alterable identification number that is unique to that unit. An additional set of complementary contacts 116, 118 and electrode 120 (corresponding to contacts 54, 56 and electrode 70 shown in FIG. 3) are symmetrically arranged on the receiving platform 114 or in cavity 117 to accept reversible insertion of the coin box 12, and provide positive operative contact with electrodes 50, 52, 70 installed on the underside of the coin box 12. A lid 115 is hingedly affixed to the mobile cart 102 to protect, in the down and closed position, components of the inventorying apparatus 104 provided in a cavity 117 of the mobile cart 102 during periods of non-use.

The coin box 12 is received in the manner previously described and weighed by calibrated scale 108 mounted to the mobile cart 102. The calibrated scale 108 may be any scale useful for determining a weight differential of single coins/tokens passed through the scale apparatus. In connection with coin collection box identifying data, including tare weight of the coin box 12 and designated coinage to be received therein, the net weight and aggregate value of the contents collected in the coin box 12 is transferred to the on-board CPU 106 for on-board storage of this data, to be downloaded to a remote CPU 121. It will be understood that data downloading may occur concurrently with an inventorying operation, or subsequently thereto either on an individual host-machine basis or on a batch basis.

Information gathered by memory device 44 of the coin collection box 12 can include host machine 10 identification, time and date information, and data transferred from a coin meter 125 (FIG. 3) in the host machine and stored in the coin collection box 12 for use in comparing count and weight and alerting the appropriate personnel to a measured difference between readings obtained from the calibrated scale 108 and coin meter 125 data. When coin box 12 is electrically connected to electrodes 116, 118, 120, the data or information stored in memory device 44 is downloaded to on-board CPU 106 for later downloading to remote CPU 121, or directly to remote CPU 121.

The mobile cart 102 according to the present invention includes a unitary body 120 containing one or more hoppers 122, 124, 126 each designated by placards 128, 130, 132, respectively, for receiving the designated denomination of coins/tokens after measurement. Coins/tokens may be transferred to a bucket 123 to be received within a selected hopper 122, 124, 126. After transfer of coins/tokens to the mobile cart 102, each hopper 122, 124, 126 is closed with a hinged lid 134, 136, 138, respectively, to be secured in a closed and locked position during transport or non-use of the apparatus 104 or the coins are placed in the hopper through an articulated chute which disallows entry of a retrieving device or human hand to remove the coins/tokens. According to the invention, a mixed aggregation of coins/tokens may be separated by denomination by a coin separator (not shown) into separate hoppers. Also, apparatus may be provided within the hoppers to receive, separate, and stack designated denominations of coins/tokens for reuse in pre-sized, pre-valued stacks.

Figure 25:
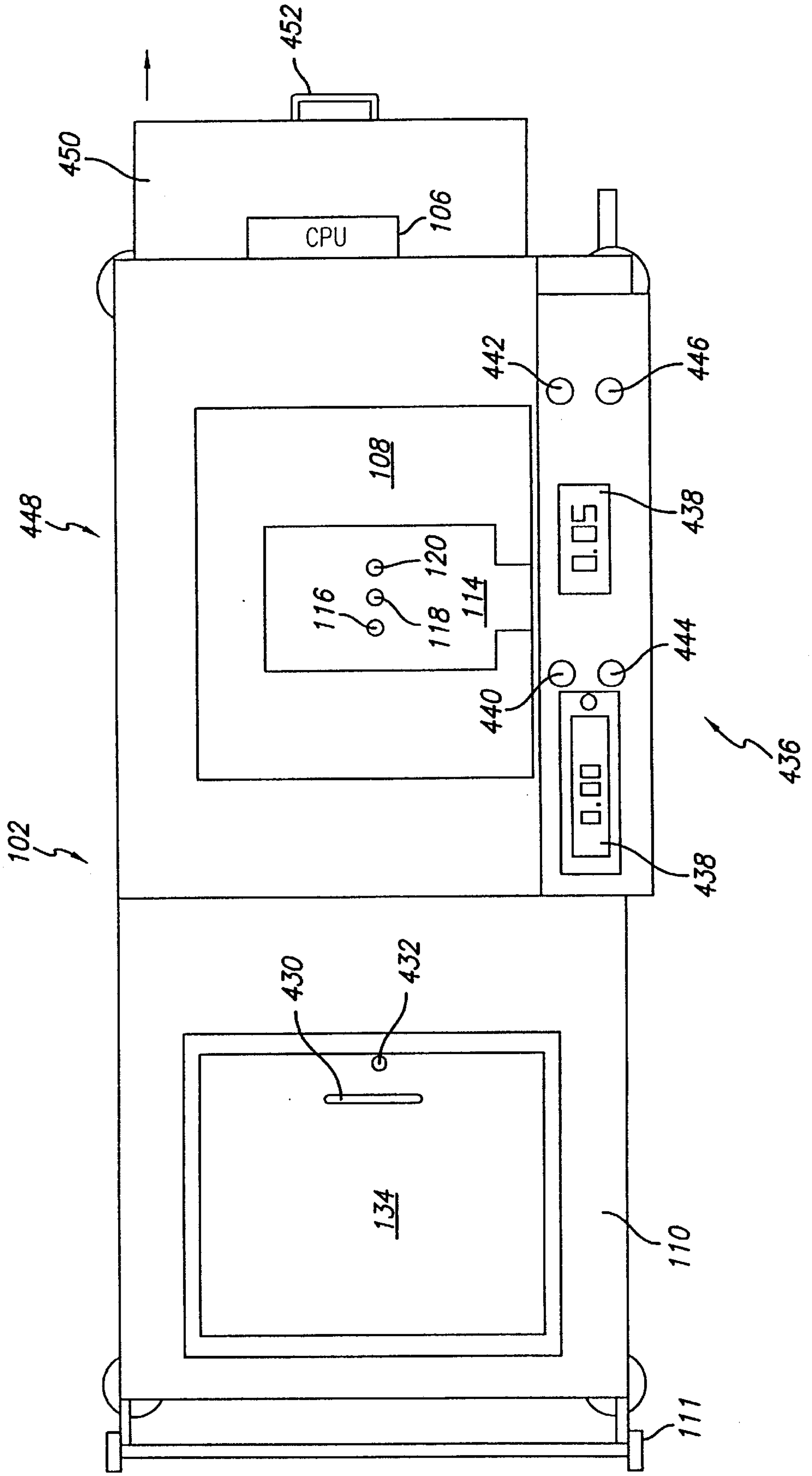
FIG. 25 is a top plan view of the mobile cart of FIG. 22, showing the drawer partially pulled-out.

With reference to FIGS. 11 and 18–22, in a preferred embodiment, the lids 134, 136, 138 include a splash guard (generally designated 410) for preventing coins or tokens from spilling therefrom when being transferred into secure coin/token receiving container 110 and/or hoppers 122, 124, 126. For exemplary purposes only lid 134 is shown in the Figures as having the splash guard 410 associated therewith. The splash guard 410 can be any member that extends between the secure coin/token receiving container 110 and the lid 134, when the lid 134 is in the raised position. In a preferred embodiment, the lid 134 includes two splash guards 410, one for each side thereof. It will be understood that the splash guards 410 generally operate as a mirror image of one another. The splash guard 410 can be made of any material durable enough to prevent coins or tokens from escaping when being poured into the secure coin/token receiving container 110. For example, the splash guard 410 can be made of metal, rubber, plastic, cloth etc. In a preferred embodiment, the splash guard 410 comprises a generally triangular shaped member that, when the lid 134 extends upwardly at an approximately 90° angle from the secure coin/token receiving container 110, forms an approximately right triangle having a hypotenuse that extends from the lid 134 downwardly at an angle to the secure coin/token receiving container 110, as shown best in FIG. 18. It is within the scope of the present invention to include a splash guard 410 with a lid that opens further than approximately 90°, as shown in FIG. 25.

The lid 134 is hingedly connected to the secure coin/token receiving container 110 via a hinge 428 and includes a handle 430 spaced from the hinge 428. The lid 134 also preferably includes a lock 432, such as a high security gaming lock, that is preferably associated with the end of the lid 134 opposite the hinge 428. The lock 432 prevents undesired entry into secure coin/token receiving container 110 The lock 432 may be a key lock, combination lock, or other lock as is known in the art.

In a preferred embodiment, the splash guard 410 includes an upper leaf 412 and a lower leaf 414 that are hingedly connected by at least one spring hinge 416 or the like. The lower leaf 414 includes an elongated hinge portion 418 that hingedly connects to a support block 420 via a hinge pin 422. The hinge portion 418 can form a unit with the lower leaf 414 or it can be a separate piece that is affixed to the lower leaf 414. The support block 420 is fastened to the hopper 134 via at least one threaded fastener 424, rivet or the like. The support block 420 can form a unit with the secure coin/token receiving container 110. The upper leaf 412 includes a hinge portion 426 that hingedly connects to the lid 134 via a hinge pin 422. The hinge portion 426 of the upper leaf 412 can form a unit with the upper leaf 412 or can be a separate piece affixed thereto.

Figure 19:
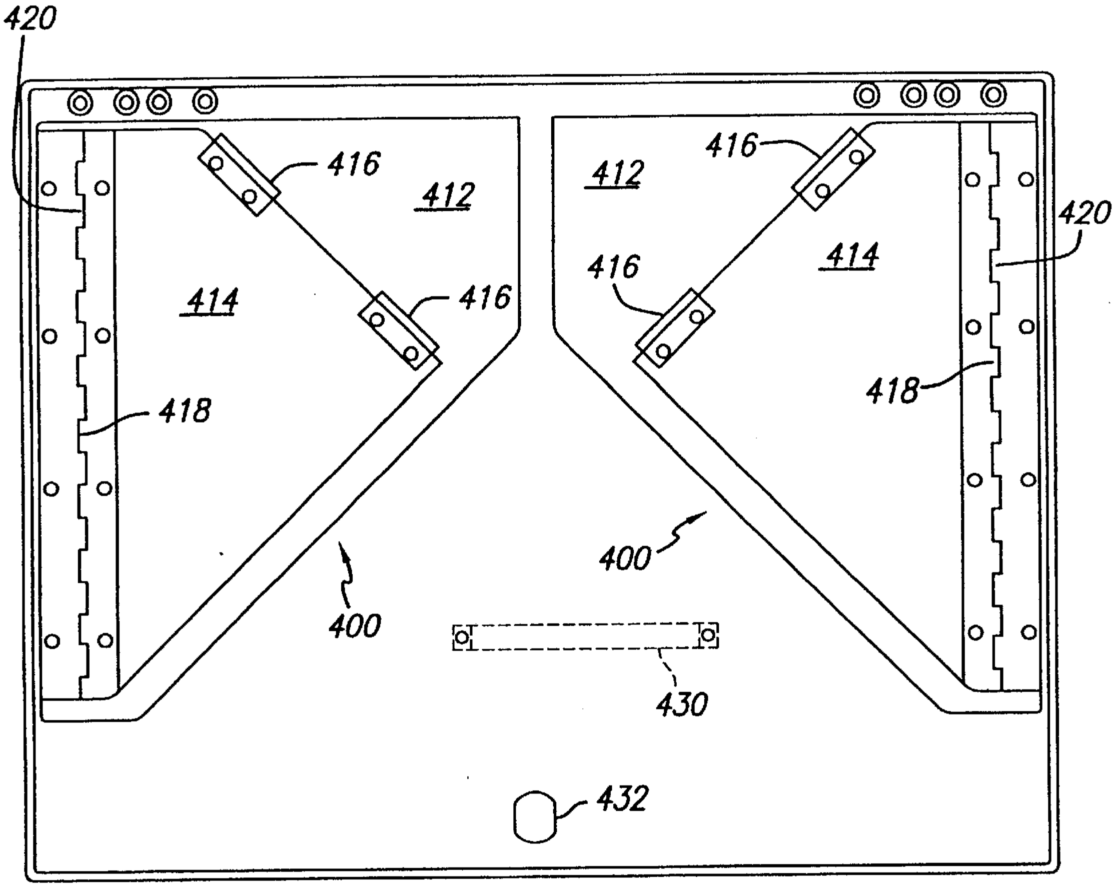
FIG. 19 is a bottom detail plan view from inside the mobile cart showing the lid and splash guard of FIG. 18 in a closed position.
Figure 20:
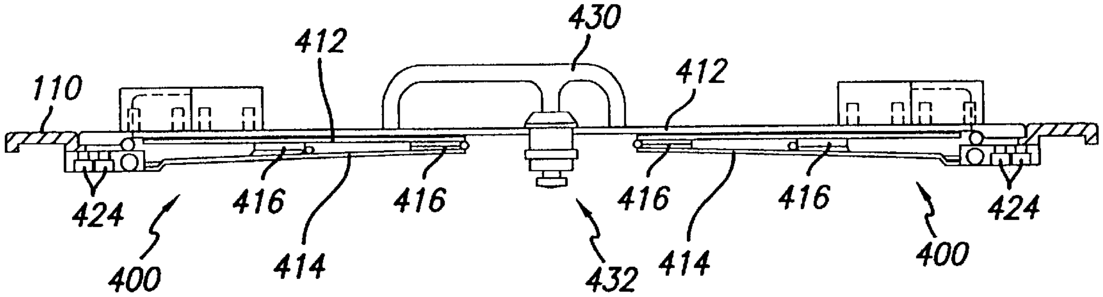
FIG. 20 is a front detail elevational view of the lid and splash guards of FIG. 19.
Figure 22:
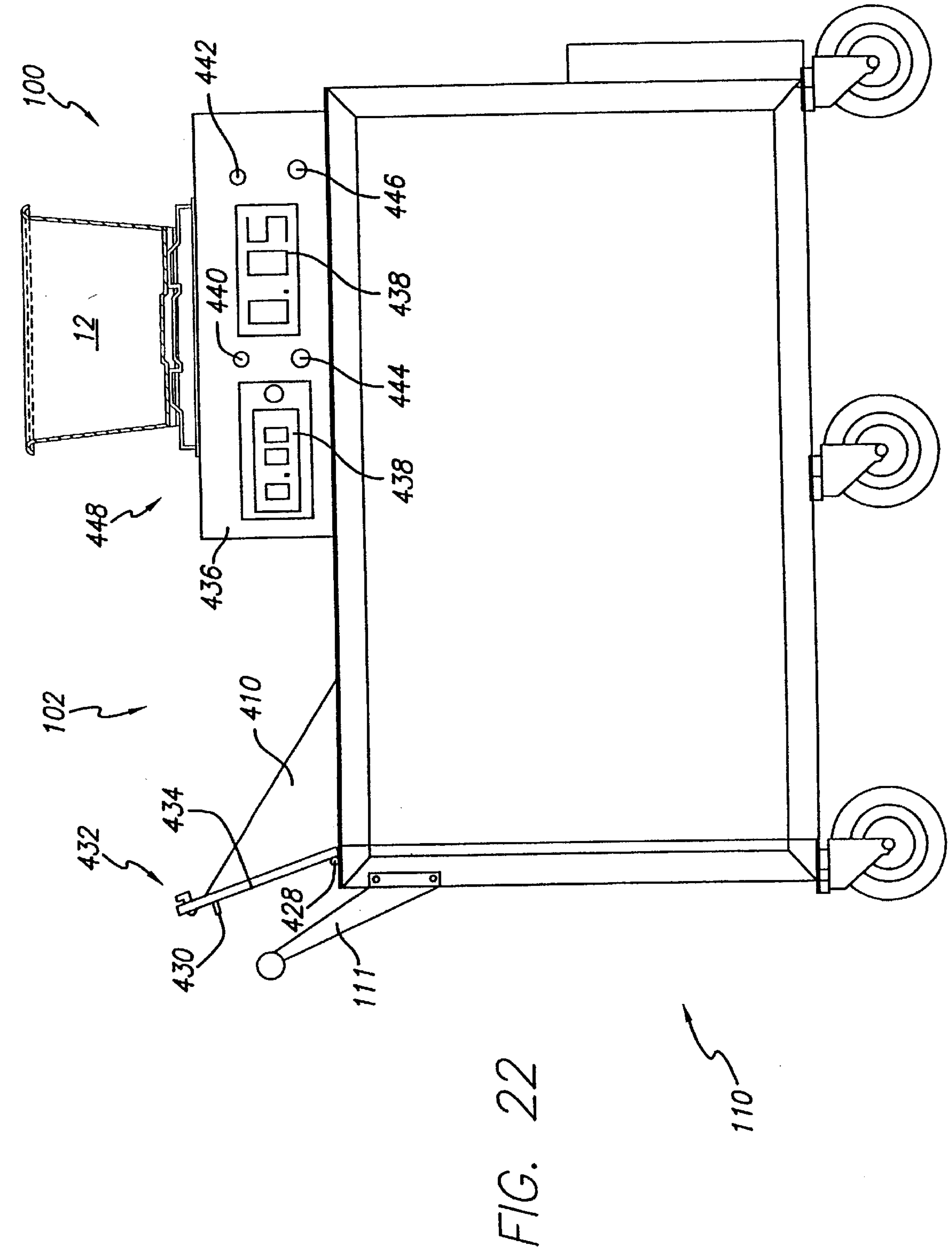
FIG. 22 is a side elevational view of a mobile cart in accordance with a preferred embodiment of the present invention.
Figure 23:
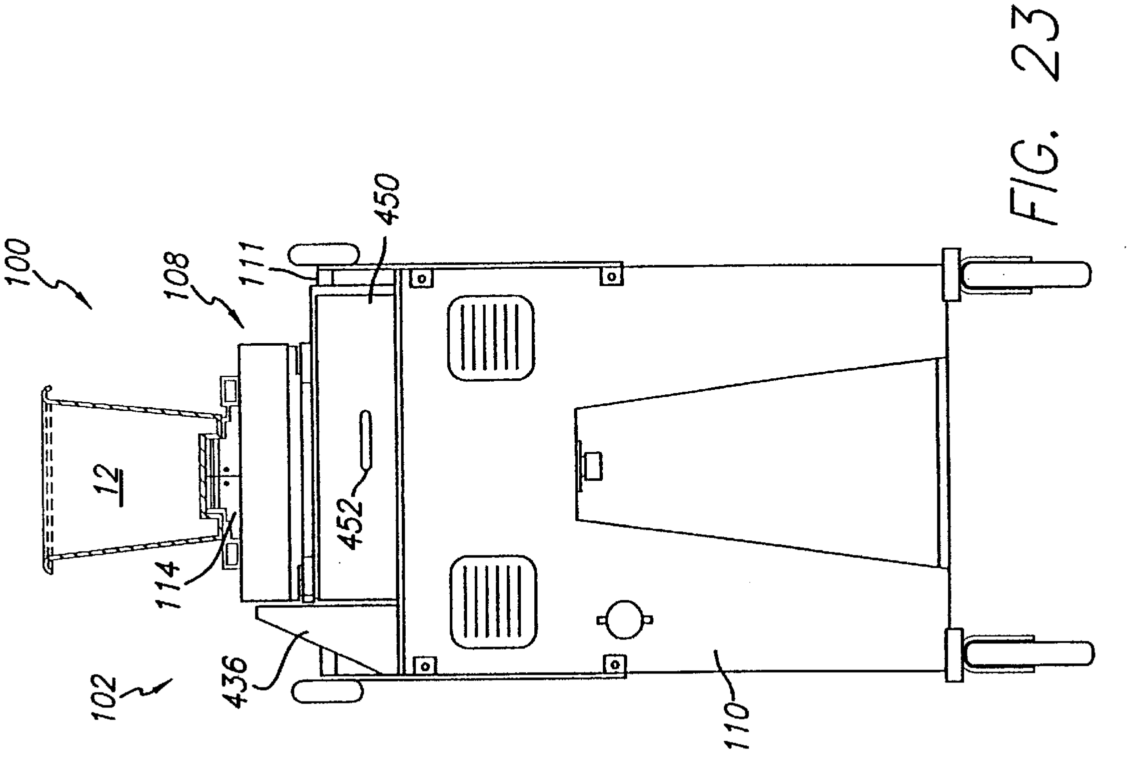
FIG. 23 is a rear elevational view of the mobile cart of FIG. 22.
Figure 24:
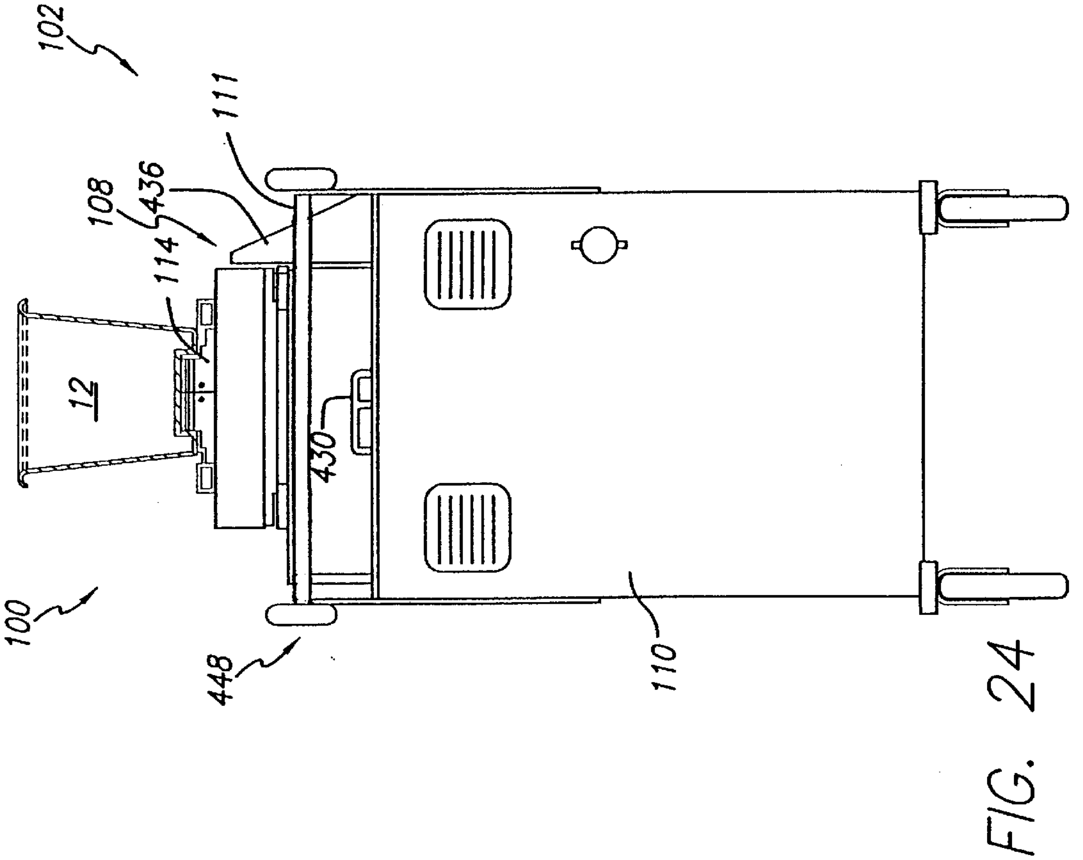
FIG. 24 is a front elevational view of the mobile cart of FIG. 22.

The lid 134 in its closed position is shown in FIGS. 19 and 20. As shown, the upper and lower leaves 412, 414 are hinged in a position wherein they are substantially parallel to the lid 134. At most, there is a very acute angle formed by the upper and lower leaves 412, 414, as shown in FIG. 20.

Figure 18:
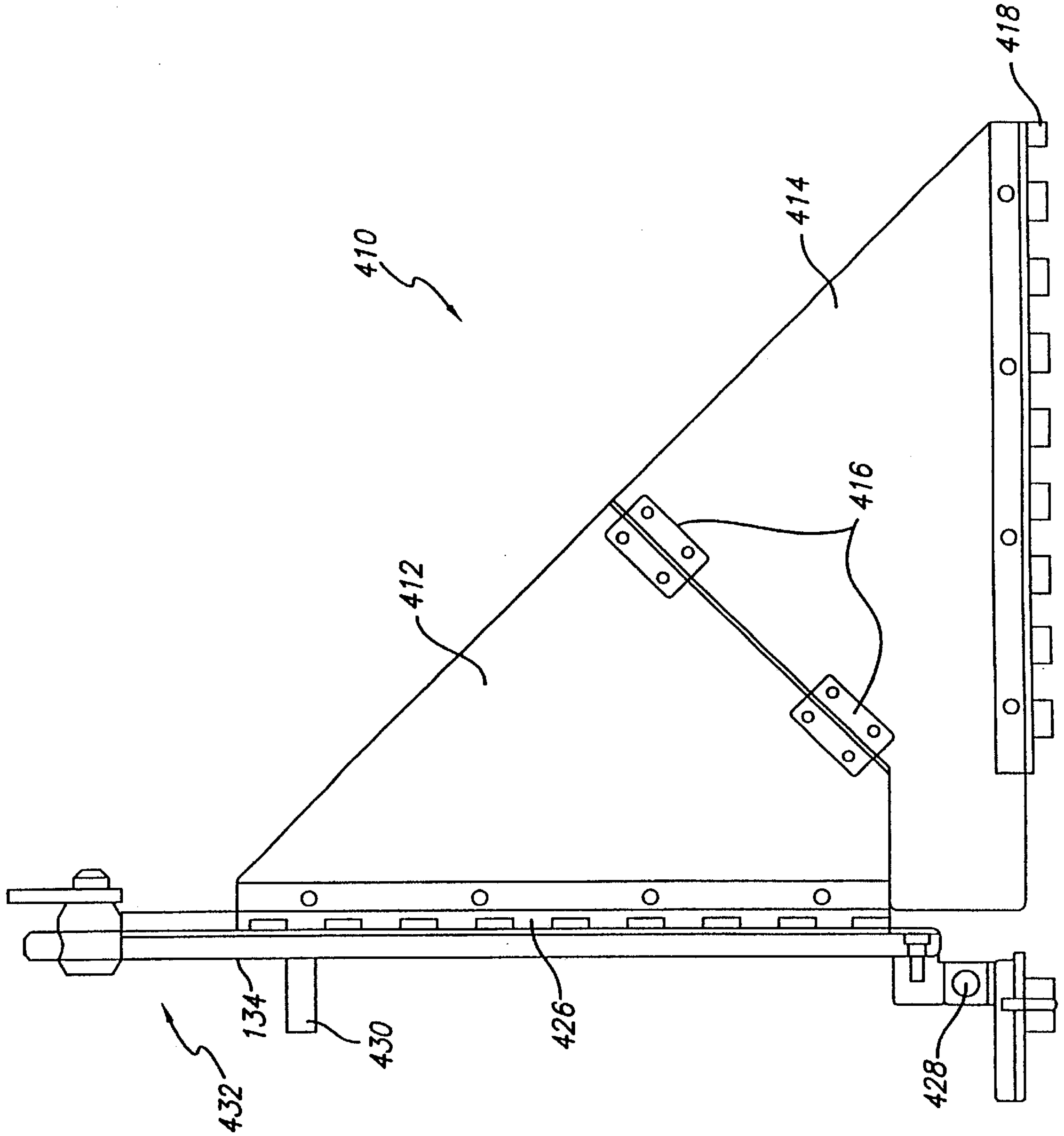
FIG. 18 is a side detail elevational view of the lid of the present invention including a splash guard, in accordance with an embodiment of the present invention.

As the lid is opened, spring hinges 416 hinge portions 418, 426 and support block 420 all cooperate to cause the angle formed by the upper and lower leaves 412, 414 to widen until it reaches approximately 180° (i.e., upper and lower leaves 412, 414 are approximately co-planar), as is best shown in FIG. 18.

Figure 11:
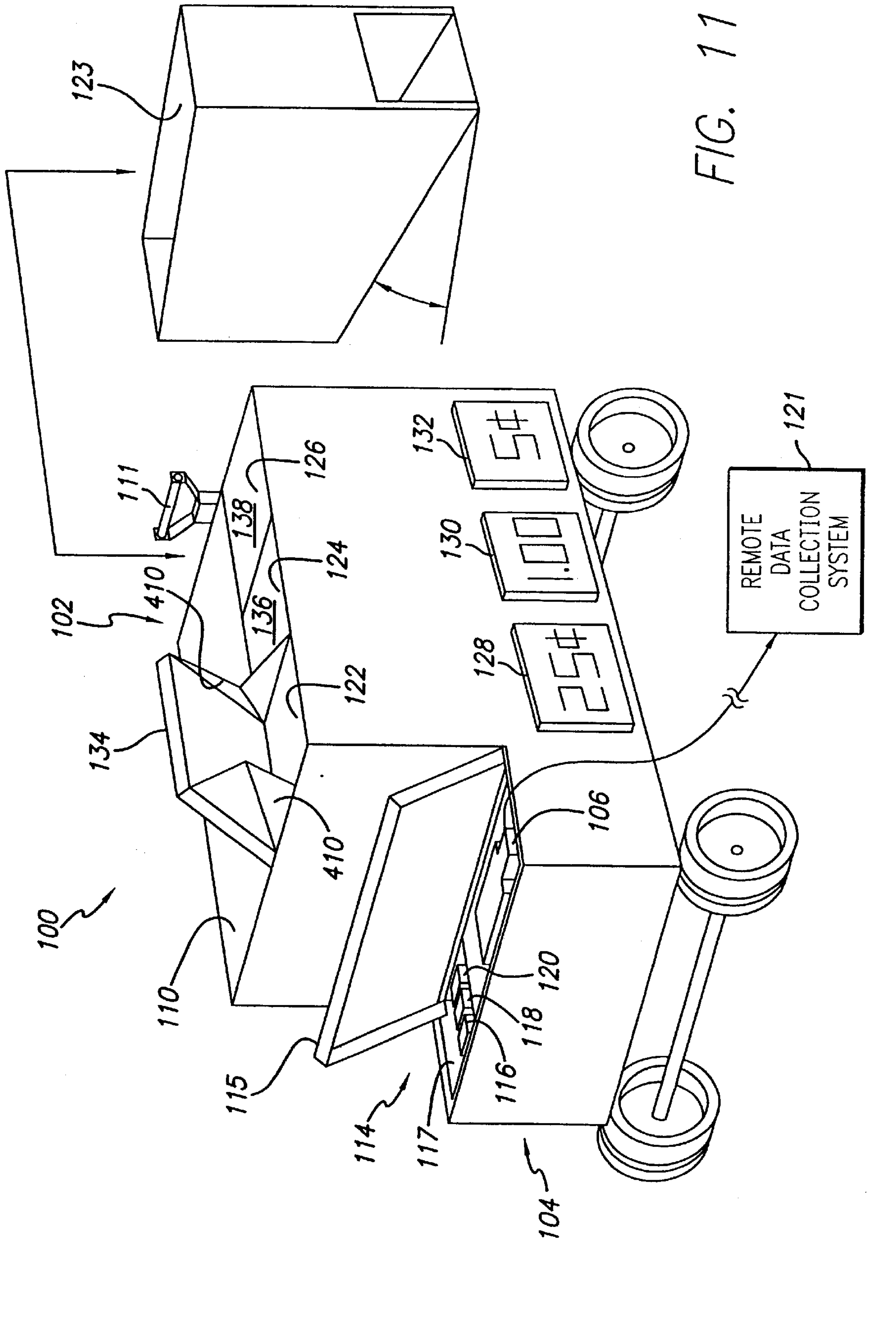
FIG. 11 is a perspective, diagrammatic view of one embodiment of the mobile cart of the present invention, showing a plurality of individual coin/token receiving bins, scale and a CPU mounted on-board the mobile cart.
Figure 12:
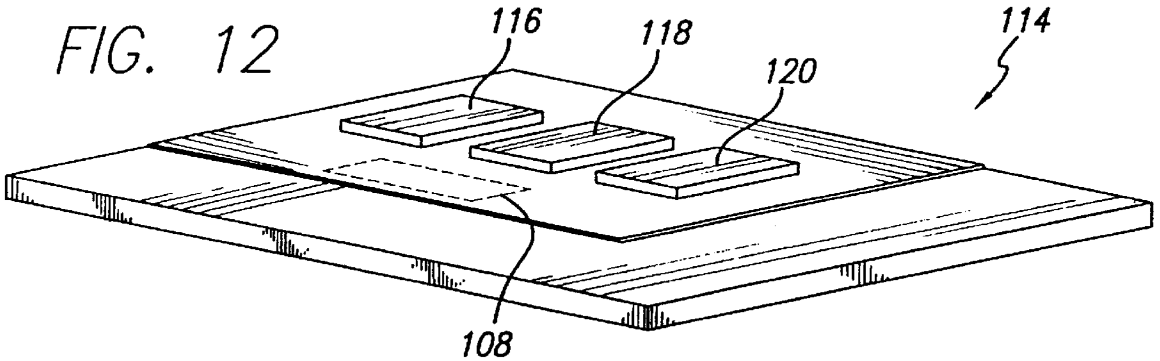
FIG. 12 is a perspective view of a coin collection box receiving platform to be mounted to the mobile cart of the present invention for receiving and weighing a coin box according to the invention.

In another embodiment, the splash guard 410 may be a pliable material such as cloth, rubber, plastic, etc. In this embodiment a portion of the splash guard 410 is affixed to the lid 134, and a portion is affixed to the secure coin/token receiving container 110. When the lid 134 is closed, the splash guard 410 is folded upon itself. As the lid 134 is hinged open, the splash guard 410 unfolds, as is shown in FIG. 11, until the two splash guards 410 on the opposite sides of the lid are approximately parallel.

Figure 21:
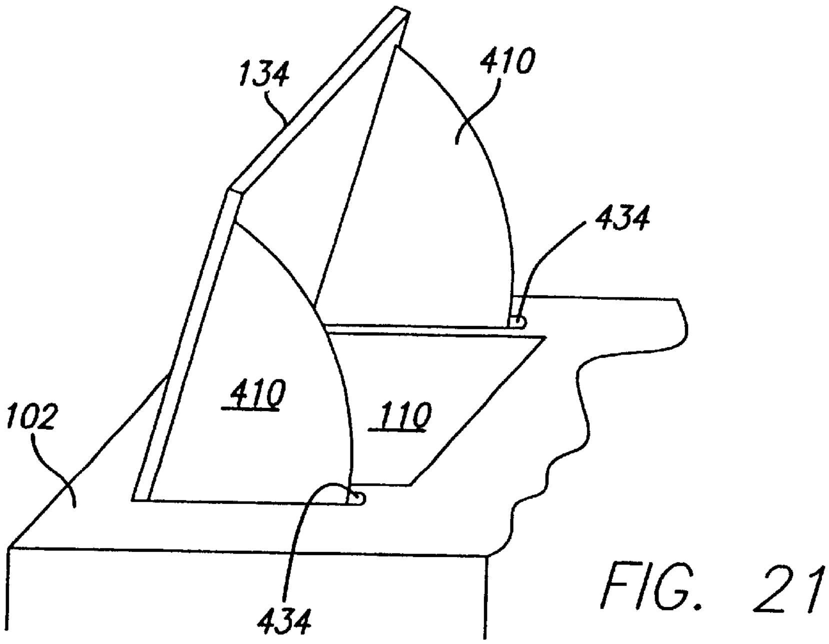
FIG. 21 is a perspective cut-away view of a lid of the mobile cart with splash guards in accordance with an embodiment of the present invention.

In yet another embodiment, the top surface of the cart 102 can include a pair of slots 434 within which the splash guard 410 can register, as shown in FIG. 21. In this embodiment, the splash guard 410 is a planar piece that is inserted and withdrawn from the slot 434 as the lid 134 is raised and lowered. Alternatively, the slots can be omitted and the splash guard 410 can simply register within the secure coin/token receiving container 110.

With reference to FIGS. 22–25, in a preferred embodiment, the mobile cart 102 includes a front control panel 436 that includes at least one display device, such as an LCD display or the like, at least one key or button, and at least one light or other indicator. Preferably, the panel includes two numerical display devices 438 (one for displaying weight data from the scale 108 and one for displaying machine denomination information), a bright red light 440, a bright green light 442, a "denomination override" button 444 and a "reset" button 446. The purpose of the front panel 436 is to provide a simple and limited interface with the software of the on-board CPU 106. This allows the CPU 106 running the software to be securely locked in a compartment on the cart, such as cavity 117 or in a drawer 450 (as described below) while still allowing the operator to verify data is being correctly collected during an inventorying/drop operation. The front control panel 436 is electrically connected to the scale 108, and the circuitry in the receiving platform 114, such as the contacts 116, 118 and electrode 120, to receive input information. The purpose of the displays 438 is to show weight and machine denomination information as data is being collected from each coin box 12 during a drop operation. The displays 438 are provided to allow visual security methods and to provide feedback to the operator confirming the system is working correctly.

As mentioned, preferably the panel 436 includes a red and a green light 440, 442 (the color of the light is not a limitation on the invention). The purpose of the red and green lights 440, 442 is to indicate to the operator the current status of the software. For example, the lights can be programmed to indicate one of four states: (1) Red light 440 on, green light 442 off—There is no coin box 12 detected on the receiving platform 114. The CPU 106 is ready to collect data from a new coin box 12. (2) Red light 440 off, green light 442 on—The CPU 106 has successfully collected all data from the coin box 12 and the scale 108 and cleared the coin box 12 to allow it to be used in another machine 10. During this phase, the operator can change the denomination information if it does not match the coins in the coin box 12. Removing the coin box 12 from the receiving platform 114 causes the data to be saved to the database on the software of one of the CPUs. (3) Red light 440 flashing, green light 442 flashing—There is an error. The coin box 12 data was not collected successfully for some reason, the coin box 12 has not been initialized, etc. Removing the coin box 12 and placing it back on the receiving platform 114 restarts the data collection process. (4) Red light 440 off, green light 442 off—If there is a coin box 12 on the collection pad, this means that the software is in the middle of collecting data from the coin box 12 and scale 108. Both lights 440, 442 should only be off for a few seconds. If there is no coin box 12 on the receiving platform 114, and both lights 440, 442 are off, the software is not ready to collect data. The operator must enable the data collection capabilities.

If there are data entry errors when setting up the machine database within the software or the denomination of a machine 10 was changed without updating the machine database within the software, the displayed denomination will not match the coins in the coin box 12. If this is the case, the "denomination override" button 444 is used to allow the operator to change the denomination information to match. When the green light 442 is on and the coin box 12 is still on the receiving platform 114, the operator can push the "denomination overrride" button 444 to cycle through the available denominations. When the correct denomination is displayed, the coin box 12 can be removed from the receiving platform 114. Removing the coin box 12 commits the collected data and locks in the denomination selection. When pressed, "reset" button 446 resets the displays 438.

Still referring to FIGS. 22–25, in a preferred embodiment of the present invention, the mobile cart 102 includes a removable controller portion 448 that can be interchangably usable on separate mobile carts. Preferably, the removable controller portion includes the scale 108, the front panel 436, any other inventorying apparatus 104 (such as, without limitation, the receiving platform 114), and the on-board CPU 106. In the event of failure, the CPU 106 can be connected to some type of backup medium, such as a floppy disk, hard drive, external ZIP drive or internal FLASH memory card connected to the CPU. In another embodiment, the CPU can transmit the data to a printer or via an RF transmitter unit (or other wireless transmitter) that can send the information to a remote computer (such as remote CPU 121). The backed-up information is recorded every time a new coin box 12 is placed on and removed from the receiving platform 114.

The removable controller portion 448 is constructed as an integral unit. This integral unit is preferably fitted to the mobile cart 102 using alignment screws, and a floating connector system, which preferably allow the unit to be inserted or removed from the mobile cart 102 in a single movement. However, it will be understood that the removable controller portion 448 can be secured to the mobile cart 102 by any known method. For example, the mobile cart 102 can include slide rails, such that when the removable controller portion 448 is placed thereon and slid into place, proper electrical connection is made; or, the removable controller portion may be hinged to the mobile cart 102. A single removable controller portion 448 carries all power and data signals required to run all the components of the system.

The CPU 106 can be located in a drawer 450 having a handle 452, as shown in FIG. 25. The drawer 450 can be included in embodiments with or without the removable controller portion 448. The drawer 450 can be locked, thereby preventing access to the CPU by unauthorized personnel, but providing easy access to authorized personnel. For example, the CPU 106 can be locked inside drawer 450 and the operator (who may not be authorized to access the CPU 106) can use the front control panel 436 to perform an inventorying or drop operation. However, for ease of access to the CPU 106, an authorized operator can simply unlock and pull out the drawer 450.

Figure 13:
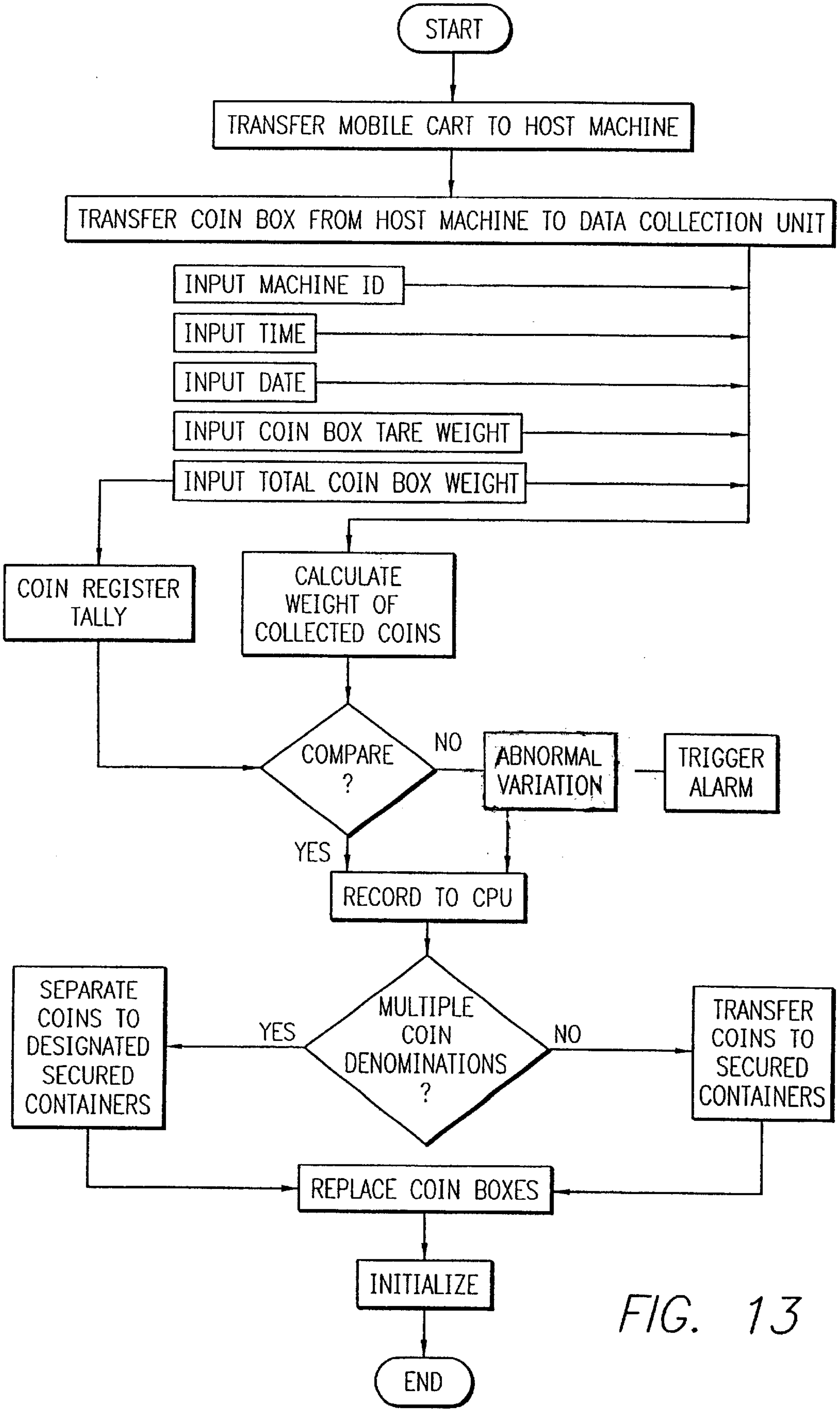
FIG. 13 is a flow chart of a method of receiving and inventorying coins/tokens collected from a host machine, and transmission of equipment- and inventory-specific information and data to on-board and remote CPUs.

With reference to FIG. 13, the mobile cart system 100 is preferably operated as follows. The mobile cart 102 is transported adjacent to a host machine 10 designated for coin/token collection. The mobile cart operator extracts the coin box 12 from the host machine 10 and places the coin box 12 on the receiving platform 114 of the mobile cart 102 in the manner previously described with respect to installation within a host machine 10 to achieve full electrical contact between respective sets of electrodes. Aggregate coin/token weight is measured by the calibrated scale 108 after adjusting for coin box tare weight, and this information is transmitted to the on-board CPU 106 via data link 107. Also inputted to the on-board CPU 106 is collection time and date information, mobile cart operator identification, coin box identification and other accounting information gathered from the host machine. According to the invention, and to overcome the prior art problem of lost or unaccounted coins, coin/token data transferred to the on-board CPU 106 from the coin meter 125 is compared with corrected data recorded in the on-board CPU 106 obtained from the calibrated scale 108, a significant discrepancy calculated between the calibrated scale 108 and coin meter 125 causes an alert to be sounded to the mobile cart operator and/or casino operator. The measured discrepancy is further recorded to the remote CPU or data collection system 121 for analysis. A paper bill counter (not shown) can be used instead of the coin meter 125 during collection of paper money or scrip. After weighing and accounting of collected moneys information, the contents of the coin box 12 are transferred to the appropriate hopper 122, 124, 126 for secure retention prior to return transport of the mobile cart to a coin/token collection facility during which time data collected in the on-board CPU 106 is preferably downloaded to the remote data collection system 121 for subsequent analysis, reporting, and storage.

The normal sequence of events for collecting data from a coin box 12 is to remove the coin box 12 from the receiving station 114, if there is one. The red light 440 on the panel 436 should be lit. Next, a coin box 12 from a host machine 10 is placed onto the receiving platform 114. Both lights 440, 442 should go out for a few seconds and then the green light 442 will come on. When the green light 442 is on, the panel 436 also displays the denomination of the machine 10 from the database. If the denomination is incorrect, it can be changed as described earlier. Next the coin box 12 is removed from the receiving platform 114 and the collected data is stored in a session database. The green light 442 goes off and the red light 440 comes on indicating that the software is ready to retrieve data from the next coin box 12.

The machine denomination from the database and the denomination from the front panel are both saved in the session database. Since changing the denomination also changes the drop count calculated from the coin weight, both the machine denomination drop count and the front panel denomination drop count are saved in the database. This information can be viewed and manipulated by exporting the session data.

Figure 14:
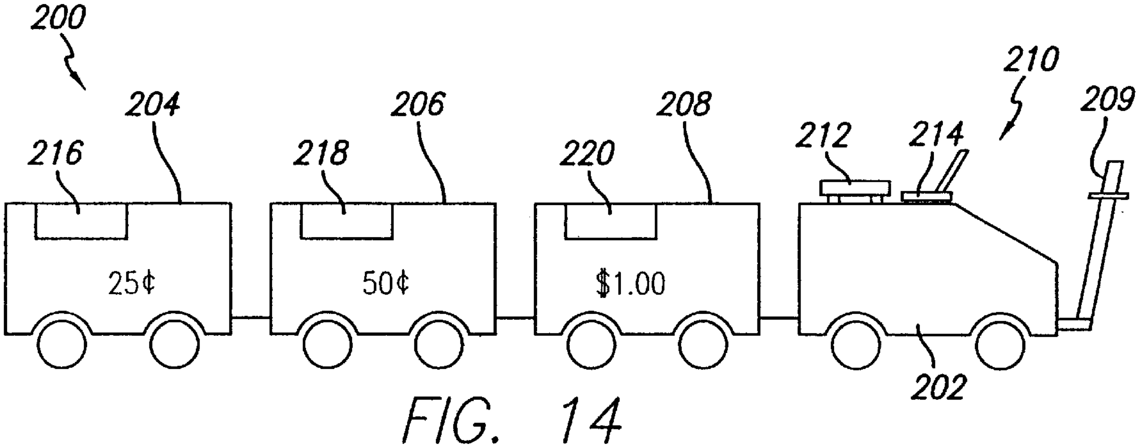
FIG. 14 is a perspective, diagrammatic view of another embodiment of the inventorying and collection apparatus of the present invention, showing a self-propelled tow vehicle for pulling a train of money collection carts, each cart including at least one secure coin/token receiving bin.

With reference to FIG. 14, the present invention further includes mobile apparatus 200 having a self-propelled tow vehicle 202 for towing one or more serially-linked wheeled coin collection carts 204, 206, 208. Alternatively, the mobile apparatus may be configured for operation along tracked or untracked pathways, configured for manual transport by tow handle 209, or self-propelled under automatic robotic delivery system control to deliver inventoried moneys to a remote count room or other receiving facility.

The tow vehicle 202 includes inventorying apparatus 210 for receiving a coin collection box 12 from the host machine 10 in structural and electrical connection with a receiving platform 212 of the tow vehicle 202 in the manner previously described with respect to the mobile cart 102. Aggregate coin/token weight is measured by a calibrated scale (not shown) in the manner previously described, and this information is transmitted to the on-board CPU 214 by wired or modem connection. After inventorying of moneys collected in coin collection box 12, moneys segregated by denomination are transferred to secure receptacles 216, 218, 220 provided in coin collection carts 204, 206, 208, respectively, for secure retention prior to return transport of the mobile apparatus 200, or individual coin collection carts 204, 206, 208, to a coin/token collection facility.

The coin box 12 is reinstalled in the host machine 12, and reinitialized for subsequent use after transfer of moneys to the secured containers provided in the mobile cart 102 or mobile apparatus 200 of the invention. Thus, according to the invention, only a single coin box 12 is required for each host machine 10, eliminating the need to provide a replacement coin box which was previously required when one coin box was removed to a coin/token collection facility. Furthermore, secure collection and accounting of collected coins/tokens is achieved without requiring transport of collected coins/tokens to a remote location for counting.

Figure 15:
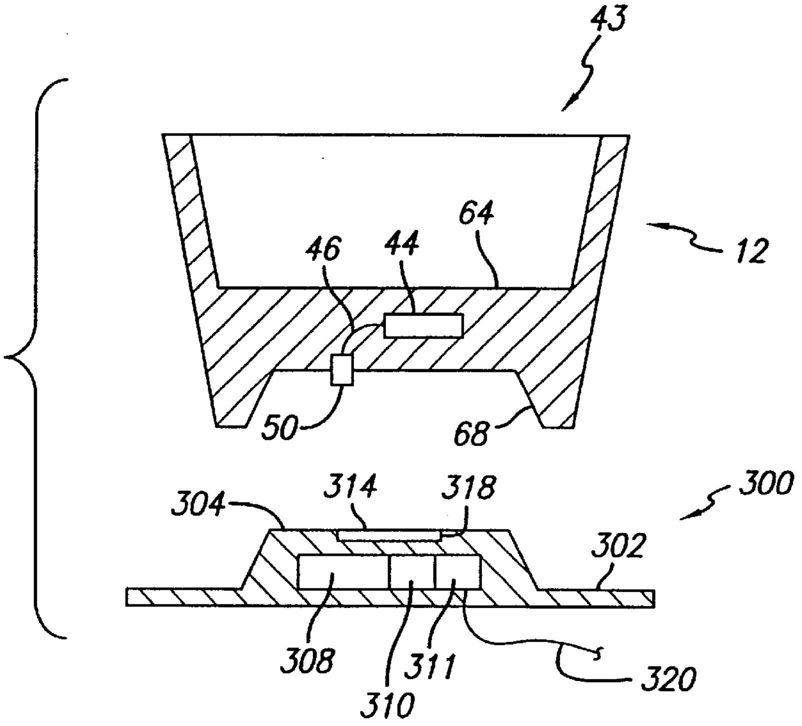
FIG. 15 is an exploded perspective detail view of a coin box and a programmable scale, in accordance with an embodiment of the present invention.
Figure 16:
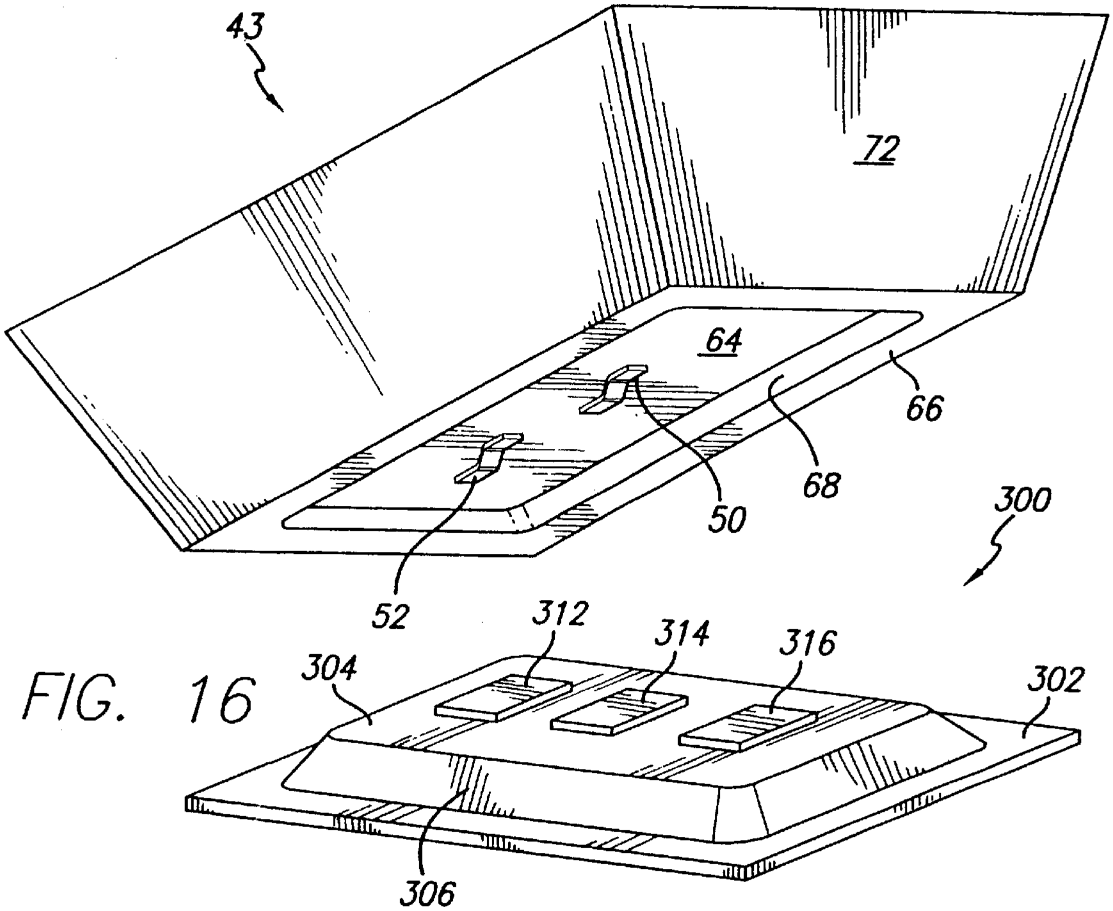
FIG. 16 is a front cross sectional view of the coin box and programmable scale of FIG. 15, where the programmable scale includes a memory device and a weighing device.
Figure 17:
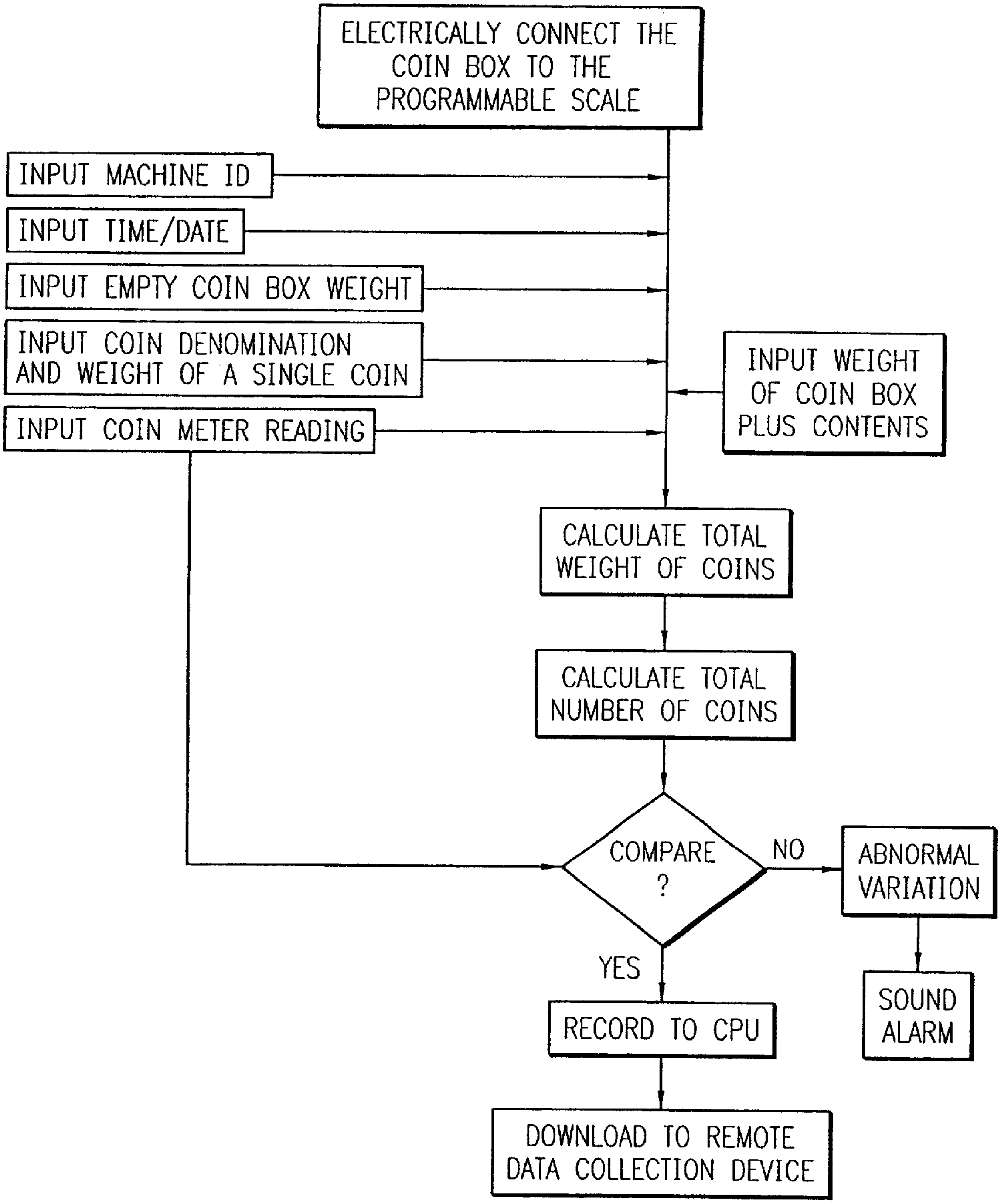
FIG. 17 is a flow chart showing a method of determining the number of coins/tokens collected from a host machine, and transmission of equipment- and inventory-specific information and data to on-board and remote CPUs.

Referring to FIGS. 15–17, another embodiment of the present invention is shown wherein the coin collection system includes a programmable scale 300 for determining the contents of the coin box 12. In a preferred embodiment, the programmable scale 300 includes a floor 302 and a projection 304 projecting upwardly from floor 302. Projection 304 has an inclined lateral wall 306 which gives projection 304 a tapered configuration wherein the top is smaller than the bottom. Wall 66 of the coin box 12 has an inclined surface 68 that complements and closely cooperates with tapered projection 304.

In a preferred embodiment, a weighing device, preferably a calibrated scale 308, is located in or on the floor 302 or the projection 304 projecting upwardly from the floor 302. The calibrated scale 308 is in electrical communication with a memory device 310, which is similar to memory device 34 as described above. Preferably, the memory device 310 and the calibrated scale 308 are a unit.

The programmable scale 300 is provided with electrically or inductively coupled contacts and circuitry configured for achieving a desired electrical connection of electrodes 50, 52, 70 of the coin box 12 in the manner previously described. Preferably, programmable scale 300 includes electrodes 312, 314 on a top surface (preferably projection 304) thereof. It will be understood that electrodes 312, 314 are similar to electrodes 54, 56 as described above, and therefore all teachings with respect to electrodes 54, 56 are equally applicable to electrodes 312, 314. Electrodes 312, 314 are preferably arranged serially, such that they align with electrodes 50, 52, so that when coin box 12 is placed on programmable scale 300 proper contact and mating of electrodes 50, 52, 312, 314 is made.

An additional electrode 316 may be disposed upon projection 304 and connected in common with electrode 314. This arrangement assures that coin box 12, which is of symmetrical construction, may be placed on programmable scale 300 with end wall 72 facing either to the front of programmable scale 300 or to the rear thereof.

When coin box 12 is placed on programmable scale 300, and contact is made between electrodes 50, 52, 312, 314, memory device 310 is in electrical communication with memory device 44 of coin box 12 and is programmed to extract the data stored in memory device 44, such as coin box identification (including empty weight of the coin box), coin operated machine identification, time/date stamp, type of contents (coin denomination) and the weight of one item of the contents, number of items of contents (as determined by the coin meter 125 of the machine), among others, without limitation.

It being recalled that coin box 12 has a memory device 44, circuitry 46 is provided to transmit signals to memory device 44. Circuitry 46 is connected to complementary circuitry 318 in programmable scale 300, which complementary circuitry 318 is in turn connected to memory device 310. Final connections are made by electrodes 50, 52 of circuitry 46 and electrodes 312, 314 of circuitry 318. Programmable scale 300 includes a cable 320 for transmitting the data collected by and stored in memory device 310 to a remote data storage device, such as central computer 24. Cable 320 may be regarded as a further component of circuitry 318, and performs the function of transmitting communication signals between memory device 310 (and any associated microprocessor, which may be included in programmable scale 300) and external computer 24 and its associated memory device (not shown apart from computer 24). It being recalled that memory device 310 is in communication with calibrated scale 308, memory device 310 can communicate data from the calibrated scale 300 and memory device 44 to central computer 24 approximately simultaneously.

In operation, when coin box 12 is placed in the predetermined position on floor 302 of programmable scale 300, such that desired electrical connection is made between electrodes 50, 52, 312, 314, calibrated scale 308 measures the weight of the coin box 12 and its contents (for example, coins). The extracted weight data is then stored in memory device 310. At approximately the same time memory device 34 extracts the data stored in memory device 44, therefore uniquely identifying the coin box 12 (and the coin operated machine 10 from which it came). The data is then transmitted via cable 320 to central computer 24, or to an on-board CPU 311 on programmable scale 300, for processing. Computer 24 includes a software program for storing and processing the data.

Processing by the computer program can include the following: The weight of the empty coin box 12 (which is stored in the coin box 12 memory device 44) is subtracted from the total weight of the coin box 12 plus the coins therein, as measured by the calibrated scale 308, thus providing the weight of the coins. The computer program has also been provided with the weight of one coin (from memory device 44). Therefore, the total number of coins contained in coin box 12 can be determined by dividing the weight of the coins by the weight of a single coin. This number can be compared to the meter readings of the coin operated machine 10 (stored in memory device 44) to determine any discrepancies. Because the coin denomination is also known, the total value of the contents of the coin box 12 can be determined also. Therefore, after placing the coin box 12 on the scale 300, the operator can almost instantaneously determine whether there are any discrepancies between the meter readings and the actual contents of the coin box 12. In a preferred embodiment, a significant discrepancy calculated between the programmable scale 300 and coin meter 125 causes an indication, such as a light or alarm, to be activated. All data is then stored in the computer database for desired use. It will be understood that data downloading may occur concurrently with a weighing operation, or subsequently thereto.

It will be understood that the scale 300 can be employed in all embodiments of the present invention described above, such as when electrodes 50, 52 are included on end wall 72 or projection 60 is omitted. Those skilled in the art can make appropriate modifications to incorporate the scale 300 with various embodiments of the coin operated machine 10. It will be further understood that projection 304 can be omitted, and floor 302 can be a flat surface upon which coin box 12 can be placed.

It is to be understood that the present invention is not limited to the embodiments described above, but encompasses any and all embodiments within the scope of the following claims.

What is claimed is:

1. A device for extracting information from a coin box of a coin operated machine, said coin box having a first memory device, said device being independent of said coin operated machine and comprising:

a) a second memory device for extracting and storing data, b) a calibrated scale in communication with said second memory device, and c) circuitry for electrically connecting said second memory device to said coin box.

2. The device of claim 1 wherein said circuitry includes at least two electrodes adapted to come into operative proximity with at least two electrodes on said coin box when said coin box is electrically connected to said device.

3. The device of claim 2 wherein said electrodes are adapted to make sliding contact with said electrodes on said coin box when said coin box is electrically connected to said device.

4. The device of claim 1 further comprising an on-board CPU in electrical communication with said memory device for processing said data stored by said memory device.

5. The device of claim 1 further comprising a cable for providing electrical communication between said memory device and a remote data storage device.

6. The device of claim 3 wherein said electrodes are arranged serially.

7. The device of claim 1 further comprising a floor and a projection having a first inclined lateral wall disposed upon said floor and projecting upwardly from said floor.

8. The device of claim 7 wherein said circuitry includes at least two electrodes mounted within said projection, said at least two electrodes adapted to come into operative proximity with at least two electrodes on said coin box when said coin box is placed on said device.

9. The device of claim 7 wherein said memory device is mounted within said projection.

10. The device of claim 1 further comprising at least one hopper for storing coins.

11. The device of claim 1, wherein said device is mobile, whereby said device can extract information from coin boxes of a plurality of coin-operated machines.

12. A method of inventorying moneys collected from a first machine comprising the steps of:

(a) providing an inventorying machine separate from said first machine, said inventorying machine including a weighing device, (b) electrically connecting a coin box to said weighing device, and (c) calculating the number of coins in said coin box.

13. The method of claim 12 wherein said weighing device includes a memory device, and wherein step (b) further comprises the steps of:

(i) inputting a machine identification into said memory device, (ii) inputting an empty coin box weight into said memory device, (iii) inputting a coin weight into said memory device, and (iv) inputting a total coin box and contents weight.

14. The method of claim 13 wherein step (c) further comprises the steps of:

(i) transmitting said machine identification, said empty coin box weight, said coin weight and said total coin box and contents weight to a CPU, (ii) subtracting said empty coin box weight from said total coin box and contents weight, thereby providing a contents weight, (iii) dividing said contents weight by said coin weight, thereby providing a total number of coins.

15. The method of claim 13 wherein step (b) further comprises the step of inputting a coin operated machine coin meter reading into said memory device.

16. The method of claim 15 further comprising the step of comparing said coin meter reading to said total number of coins.

17. The method of claim 16 further comprising the step of activating an output if said coin meter reading differs from said total number of coins by a predetermined amount.

18. The method of claim 13 wherein step (b) further comprises the step of inputting a coin denomination into said memory device.

19. The method of claim 18 further comprising the step of determining the total value of said coins in said coin box.

20. The method of claim 14 wherein said CPU is located on-board said weighing device, and comprising the additional step of downloading inventory information from said CPU to a remote data collection device.

21. A system for inventorying monies collected from a plurality of coin operated machines, comprising:

a) a mobile device having a coin-inventorying device comprising a weighing apparatus for inventorying the collected money from each of said plurality of coin operated machines separately from each of said coin operated machines, thereby obtaining money-specific inventory information for each batch of collected money, said mobile device comprising a first memory device;

b) a receptacle provided in the mobile device for securely retaining each batch of collected money after the inventorying thereof;

c) a CPU to which said collected money-specific inventory information may be transmitted; and d) a money receiving box interchangeably useable with said coin-operated machine and said mobile device, said money-receiving box comprising a second memory device for communicating with said first memory device;

whereby any inventory data stored in said second memory device may be transferred to said first memory device.

22. The inventorying system of claim 21 wherein the measurement device is a coin register.

23. The inventorying system of claim 21 further comprising a removable control unit, wherein the measurement device and the CPU are a part of the removable control unit.

24. The inventorying system of claim 21, wherein the receptacle includes a lid having a splash guard, wherein said lid is hinged and adapted to move from a closed, secure position to an open position, said splash guard being adapted to fold when said lid is in said closed position and to unfold to an operable position when said lid is moved to said open position.

25. The inventorying system of claim 21 further comprising a front panel in communication with the CPU.

26. The system of claim 21 wherein said money receiving box is adapted to make electrical connection with said coin-operated machine and said mobile device.

27. A device for receiving and inventorying moneys collected from a coin-operated machine having a collected moneys output, comprising:

a mobile cart comprising a first memory device;

a weighing apparatus proximate said mobile cart adapted to weigh batches of money and provide a digital output signal representative of the weight of at least one of said batches of money;

a collected moneys box for receiving and storing batches of money transportable between the coin-operated machine and said weighing apparatus on the mobile cart, said collected monies box comprising a second memory device adapted for electrical communication with said first memory device;

a secure receptacle for receiving said batches of money after the inventorying thereof and storing said inventoried batches of money; and a CPU comprising memory means for storing at least said digital output signal for recording inventory information;

whereby any inventory data stored in said second memory device may be transferred to said first memory device.

28. The device of claim 27, wherein the mobile cart includes a plurality of secured receptacles for receiving denominated separated moneys.

29. The device of claim 27, wherein the collected moneys are coins.

30. The device of claim 27, wherein the collected moneys are paper bills.

31. The inventorying system of claim 27 further comprising a removable control unit, wherein the weighing apparatus and the CPU are a part of the removable control unit.

32. The inventorying system of claim 27, wherien the secured receptacle includes a lid having a splash guard, wherein said lid is hinged and adapted to move from a closed, secure position to an open position, said splash guard being adapted to fold when said lid is in said closed position and to unfold to an operable position when said lid is moved to said open position.

33. A mobile cart for inventorying monies collected from a coin operated machine having a collected moneys box that includes memory, said mobile cart comprising:

(a) a receptacle for receiving and storing inventoried moneys, (b) a data reception device adapted to receive data stored in said collected moneys box of said coin operated machine, and (c) a weight measuring device in communication with the data reception device.

34. The mobile cart of claim 33 wherein the data reception device is an on-board CPU.

35. The mobile cart of claim 33 further comprising a receiving platform associated with the weight measuring device, said receiving platform adapted to receive a coin box.

36. The mobile cart of claim 35 further comprising contacts associated with the receiving platform for communicating with the coin box.

37. The mobile cart of claim 33 wherein the receptacle includes a lid having a splash guard.

38. The mobile cart of claim 33 further comprising a control panel that includes at least one display and at least one indicator light.

39. The mobile cart of claim 33 further comprising a removable control unit, wherein the weighing measuring device and the data reception unit are a part of the removable control unit.

* * * * *